US011022546B2

(12) United States Patent
Schmidt et al.

(10) Patent No.: US 11,022,546 B2
(45) Date of Patent: Jun. 1, 2021

(54) OPTICAL GAS IMAGING SYSTEMS AND METHODS

(71) Applicant: Fluke Corporation, Everett, WA (US)

(72) Inventors: Matthew F. Schmidt, River Falls, WI (US); Kirk R. Johnson, Rogers, MN (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 15/965,688

(22) Filed: Apr. 27, 2018

(65) Prior Publication Data

US 2018/0335380 A1 Nov. 22, 2018

Related U.S. Application Data

(60) Provisional application No. 62/507,203, filed on May 16, 2017.

(51) Int. Cl.
*G01N 21/3504* (2014.01)
*G06T 5/50* (2006.01)
(Continued)

(52) U.S. Cl.
CPC ....... *G01N 21/3504* (2013.01); *G01N 21/255* (2013.01); *G06T 5/50* (2013.01); *H04N 5/23229* (2013.01); *H04N 5/23245* (2013.01); *H04N 5/23258* (2013.01); *H04N 5/23293* (2013.01); *H04N 5/272* (2013.01); *H04N 5/33* (2013.01); *H04N 5/332* (2013.01); *G01N 2021/177* (2013.01); *G01N 2021/1795* (2013.01); *G01N 2021/3531* (2013.01)

(58) Field of Classification Search
USPC .................. 386/223–224, 239–248
See application file for complete search history.

(56) References Cited

U.S. PATENT DOCUMENTS 5,656,813 A * 8/1997 Moore ............... G01N 21/3504
250/330
7,189,970 B2 3/2007 Racca et al.
(Continued)

FOREIGN PATENT DOCUMENTS

JP 2014219795 A 11/2014

OTHER PUBLICATIONS

Goers et al., "Development of a compact gas imaging sensor employing a cw fiber-amp-pumped PPLN OPO," CLEO, 2001, p. 521.
(Continued)

*Primary Examiner* — Hung Q Dang
(74) *Attorney, Agent, or Firm* — Fredrikson & Byron, P.A.

(57) ABSTRACT

Systems, cameras, and software for performing optical gas imaging using thermal imaging. Processors are programmed with instructions for a method of detecting gas that includes creating a filtered background image, a filtered foreground image, and optical gas image data, and generating a display image. The filtered background image and filtered foreground images may be created by combining infrared image data from a plurality of images captured by an infrared camera module using filtering processes. The optical gas image data may be created by comparing the filtered background image and the filtered foreground image. An image may be generated that includes the optical gas image data for presentation on a display.

21 Claims, 11 Drawing Sheets

(51) Int. Cl.
*H04N 5/33* (2006.01)
*H04N 5/272* (2006.01)
*H04N 5/232* (2006.01)
*G01N 21/25* (2006.01)
*G01N 21/17* (2006.01)
*G06T 7/194* (2017.01)
*G06T 5/00* (2006.01)
*G06T 7/00* (2017.01)

(56) References Cited

U.S. PATENT DOCUMENTS

| | | | |
|---|---|---|---|
| 7,994,480 | B2 | 8/2011 | Johnson et al. |
| 8,654,328 | B2 | 2/2014 | Tkaczyk et al. |
| 8,760,509 | B2 | 6/2014 | Schmidt et al. |
| 8,822,922 | B1 | 9/2014 | Scanlon et al. |
| 9,464,984 | B2 | 10/2016 | Schmidt et al. |
| 10,267,686 | B2 | 4/2019 | Kester |
| 2002/0071122 | A1 | 6/2002 | Kulp et al. |
| 2009/0200466 | A1* | 8/2009 | Mammen .................. G06T 5/50 250/330 |
| 2009/0231588 | A1 | 9/2009 | Sutton et al. |
| 2013/0147951 | A1 | 6/2013 | Brown et al. |
| 2013/0278771 | A1 | 10/2013 | Magoun et al. |
| 2013/0321637 | A1 | 12/2013 | Frank et al. |
| 2015/0169169 | A1* | 6/2015 | Andersson .......... G06F 3/04842 715/765 |
| 2015/0269742 | A1 | 9/2015 | Bergstrom et al. |
| 2015/0316473 | A1 | 11/2015 | Kester et al. |
| 2015/0332441 | A1 | 11/2015 | Hogasten et al. |
| 2015/0369730 | A1* | 12/2015 | Schmidt ............. G01N 21/3504 250/208.1 |
| 2016/0019428 | A1* | 1/2016 | Renner .............. G06K 9/00771 382/195 |
| 2016/0080666 | A1 | 3/2016 | Stuart et al. |
| 2016/0156880 | A1* | 6/2016 | Teich ..................... H04N 5/225 348/82 |
| 2016/0238451 | A1 | 8/2016 | Zeng |
| 2017/0024871 | A1 | 1/2017 | Schmidt et al. |
| 2017/0061663 | A1 | 3/2017 | Johnson et al. |
| 2017/0272655 | A1* | 9/2017 | Sakurai ............. H04N 5/23209 |
| 2018/0033704 | A1* | 2/2018 | Suzuki ................ B23K 26/702 |
| 2019/0364227 | A1* | 11/2019 | McManus ........... H04N 5/2254 |

OTHER PUBLICATIONS

Kulp et al., "Development of a pulsed backscatter-absorption gas-imaging system and its application to the visualization of natural gas leaks," Applied Optics, vol. 37, No. 18, Jun. 20, 1998, pp. 3912-3922.

McRae et al., "Backscatter absorption gas imaging: a new technique for gas visualization," Applied Optics, vol. 32, No. 21, Jul. 20, 1993, pp. 4037-4050.

"Quantitative Optical Gas Imaging QL320 Training," Powerpoint Presentation by Providence Photonics, LLC presented Apr. 5, 2018 at 4C Conference in San Antonio, Texas, 120 pages.

Zeng et al., "Detection Limits for Optical Gas Imaging," Powerpoint Presentation by Providence Photonics, LLC, 4C Conference in San Antonio, Texas, Apr. 3-5, 2018, 15 pages.

EP Pat. App. No. 18172693.6, Extended European Search Report dated Aug. 24, 2018, 10 pages.

International Search Report and Written Opinion of the ISA/EP in PCT/US2019/033779, dated Sep. 20, 2019, 24 pgs.

\* cited by examiner

| MENU > Camera > Gas Detection Mode | | |
|---|---|---|
| Gas Detection Mode: ON ● | Image Capture ○ | Tripod ○ |
| Gas Detection Mode: OFF ○ | Video Capture ● | Handheld ● |
| Custom | | |

FIG. 10

OPTICAL GAS IMAGING SYSTEMS AND METHODS

CROSS-REFERENCES

This application claims priority to U.S. Provisional Application No. 62/507,203 filed May 16, 2017, the content of which is hereby incorporated by reference in its entirety.

BACKGROUND

Infrared imaging cameras are used in a variety of situations. For example, infrared imaging cameras are often used during maintenance inspections to thermally inspect equipment. Example equipment may include rotating machinery, electrical panels, or rows of circuit breakers, among other types of equipment. Infrared inspections can detect equipment hot spots such as overheating machinery or electrical components, helping to ensure timely repair or replacement of the overheating equipment before a more significant problem develops.

Depending on the configuration of the camera, the infrared imaging camera may also generate a visible light image of the same object. The camera may display the infrared image and the visible light image in a coordinated manner, for example, to help an operator interpret the thermal image generated by the thermal imaging camera.

Visible light and/or infrared imaging has been applied to the field of gas imaging, in which a user will inspect a target scene for the presence of a target gas. In a typical procedure, a user will illuminate the target scene with light of a wavelength that is absorbed by the target gas. In theory, the light incident on the target scene will either encounter the target gas and be at least partially absorbed, or will be scattered back to the camera at substantially full intensity from various portions of the target scene. Thus, if the camera detects substantially the full intensity of light of the illuminating wavelength from a portion of the target scene, such portion of the scene will be assumed to not comprise the target gas, as the light was not significantly absorbed. Conversely, illuminated portions of the target scene from which the camera does not detect or detects attenuated amounts of light of the illuminating wavelength are assumed to comprise the target gas, since the absence of backscattered light is indicative of the absorption properties of the gas.

These systems can be difficult to use effectively in the field due to the often small change that a gas cloud may have on an overall infrared image and may be below the noise threshold of a thermal camera. Without a sufficiently high signal to noise ratio in a thermal camera, noise (e.g., due to sensor/electronics drift, thermal fluctuations, component self-heating or other factors) may obscure subtle changes in the image due to gas, making gas recognition very difficult. In addition, the impact on the infrared image by a gas cloud may depend on the size (e.g., path thickness) and density of the gas cloud, neither of which is necessarily constant throughout a gas cloud. Thus, the degree and shape of the attenuation or augmentation from a gas cloud can vary within a scene as the gas cloud changes shape over time. These systems can be difficult to use effectively in the field due to motion of the thermal camera or thermal changes within the camera scene. These difficulties can be problematic since any one of them may cause the camera to falsely detect or falsely not detect the presence of gas.

SUMMARY

Aspects of the present invention are directed towards systems, cameras, and software for performing gas detection procedures. Aspects may include one or more processors programmed with instructions for a method of detecting gas that includes creating a filtered background image, a filtered foreground image, and optical gas image data, and generating a display image. The filtered background image may be created by combining infrared image data from a first plurality of images captured by an infrared camera module using a first filtering process, where the first filtering process includes a first filtering parameter. The filtered foreground image may be created by combining infrared image data from a second plurality of images captured by an infrared camera module using a second filtering process, where the second filtering process includes a second filtering parameter. The optical gas image data may be created by comparing the filtered background image and the filtered foreground image. The image generated may include the optical gas image data for presentation on a display.

In some aspects of the invention, the method is run in a system that may include an infrared camera module, memory, a display, and the processors. The infrared camera module can capture infrared radiation and generate infrared images of a target scene. The image generated may be displayed on the display.

In some aspects of the invention, the method is run in conjunction with a thermal imaging camera. The thermal imaging camera may include an infrared camera module, memory, and a display. The infrared camera module can capture infrared radiation and generate infrared images of a target scene. The image generated may be displayed on the display.

BRIEF DESCRIPTION OF THE DRAWINGS

FIG. 10 is an exemplary user interface showing user-selectable options for performing gas imaging operations.

DETAILED DESCRIPTION

The following detailed description is exemplary in nature and is not intended to limit the scope, applicability, or configuration of the invention in any way. Rather, the following description provides some practical illustrations for implementing various embodiments of the present invention. Examples of constructions, materials, dimensions, and manufacturing processes are provided for selected elements, and all other elements employ that which is known to those of ordinary skill in the field of the invention. Those skilled in the art will recognize that many of the noted examples have a variety of suitable alternatives.

A thermal imaging camera may be used to detect heat patterns across a scene, including an object or objects, under observation. The thermal imaging camera may detect infrared radiation given off by the scene and convert the infrared radiation into an infrared image indicative of the heat patterns. In some embodiments, the thermal imaging camera may also capture visible light from the scene and convert the visible light into a visible light image. Depending on the configuration of the thermal imaging camera, the camera may include infrared optics to focus the infrared radiation on an infrared sensor and visible light optics to focus the visible light on a visible light sensor.

Various embodiments provide methods and systems for producing thermal images with reduced noise using averaging techniques. To further improve image quality and eliminate problems that may arise from averaging (e.g. blurring, ghosting, etc.), an image alignment process is performed on the thermal images prior to averaging.

Figure 1:
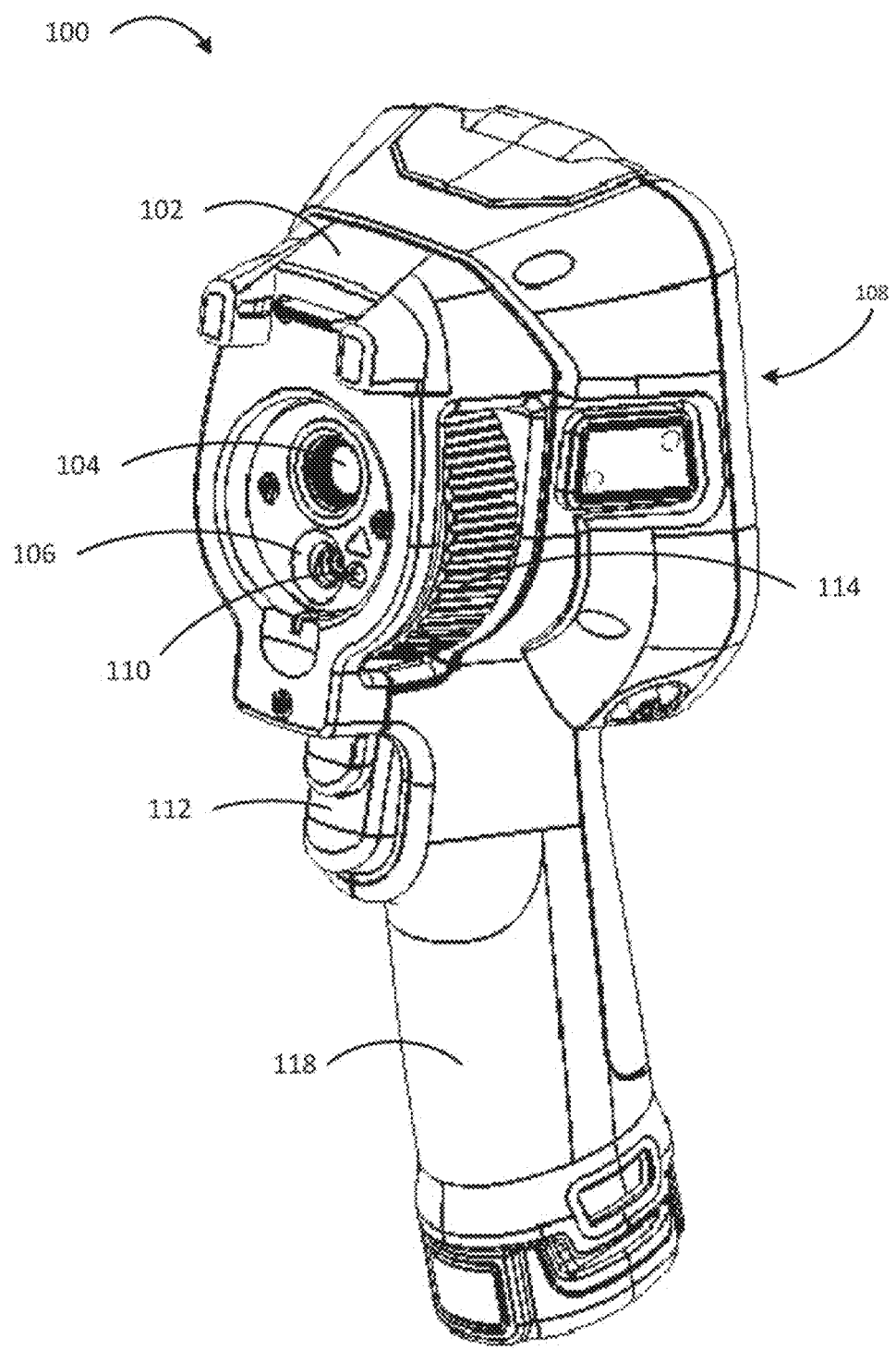
FIG. 1 is a perspective front view of an example thermal imaging camera.
Figure 2:
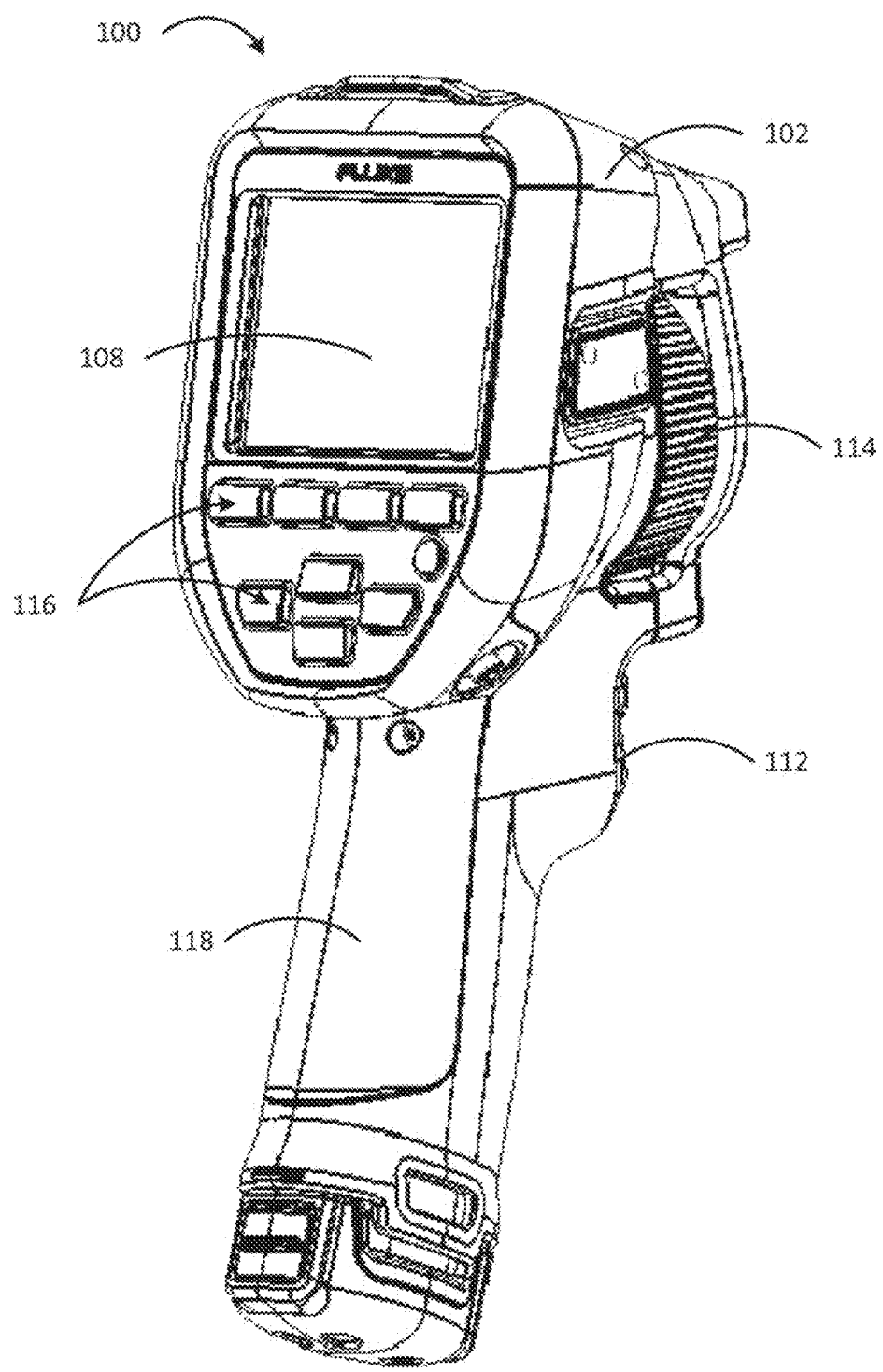
FIG. 2 is a perspective back view of the example thermal imaging camera of FIG. 1.

FIGS. 1 and 2 show front and back perspective views, respectively of an example thermal imaging camera 100, which includes a housing 102, an infrared lens assembly 104, a visible light lens assembly 106, a display 108, a laser 110, and a trigger control 112. Housing 102 houses the various components of thermal imaging camera 100. The bottom portion of thermal imaging camera 100 includes a carrying handle 118 for holding and operating the camera via one hand. Infrared lens assembly 104 receives infrared radiation from a scene and focuses the radiation on an infrared sensor for generating an infrared image of a scene. Visible light lens assembly 106 receives visible light from a scene and focuses the visible light on a visible light sensor for generating a visible light image of the same scene. Thermal imaging camera 100 captures the visible light image and/or the infrared image in response to depressing trigger control 112. In addition, thermal imaging camera 100 controls display 108 to display the infrared image and the visible light image generated by the camera, e.g., to help an operator thermally inspect a scene. Thermal imaging camera 100 may also include a focus mechanism coupled to infrared lens assembly 104 that is configured to move at least one lens of the infrared lens assembly so as to adjust the focus of an infrared image generated by the thermal imaging camera. Additionally or alternatively, the focus mechanism may move the FPA relative to one or more lenses of the infrared lens assembly.

In operation, thermal imaging camera 100 detects heat patterns in a scene by receiving energy emitted in the infrared-wavelength spectrum from the scene and processing the infrared energy to generate a thermal image. Thermal imaging camera 100 may also generate a visible light image of the same scene by receiving energy in the visible light-wavelength spectrum and processing the visible light energy to generate a visible light image. As described in greater detail below, thermal imaging camera 100 may include an infrared camera module that is configured to capture an infrared image of the scene and a visible light camera module that is configured to capture a visible light image of the same scene. The infrared camera module may receive infrared radiation projected through infrared lens assembly 104 and generate therefrom infrared image data. The visible light camera module may receive light projected through visible light lens assembly 106 and generate therefrom visible light data.

In some examples, thermal imaging camera 100 collects or captures the infrared energy and visible light energy substantially simultaneously (e.g., at the same time) so that the visible light image and the infrared image generated by the camera are of the same scene at substantially the same time. In these examples, the infrared image generated by thermal imaging camera 100 is indicative of localized temperatures within the scene at a particular period of time while the visible light image generated by the camera is indicative of the same scene at the same period of time. In other examples, thermal imaging camera may capture infrared energy and visible light energy from a scene at different periods of time.

Visible light lens assembly 106 includes at least one lens that focuses visible light energy on a visible light sensor for generating a visible light image. Visible light lens assembly 106 defines a visible light optical axis which passes through the center of curvature of the at least one lens of the assembly. Visible light energy projects through a front of the lens and focuses on an opposite side of the lens. Visible light lens assembly 106 can include a single lens or a plurality of lenses (e.g., two, three, or more lenses) arranged in series. In addition, visible light lens assembly 106 can have a fixed focus or can include a focus adjustment mechanism for changing the focus of the visible light optics. In examples in which visible light lens assembly 106 includes a focus adjustment mechanism, the focus adjustment mechanism may be a manual adjustment mechanism or an automatic adjustment mechanism.

Infrared lens assembly 104 also includes at least one lens that focuses infrared energy on an infrared sensor for generating a thermal image. Infrared lens assembly 104 defines an infrared optical axis which passes through the center of curvature of lens of the assembly. During operation, infrared energy is directed through the front of the lens and focused on an opposite side of the lens. Infrared lens assembly 104 can include a single lens or a plurality of lenses (e.g., two, three, or more lenses), which may be arranged in series. In some examples, the infrared lens assembly 104 may include lenses having diffractive or reflective properties or elements. Additional optical components such as mirrors (e.g., Fresnel mirrors) and the like may be included within or otherwise proximate to the infrared lens assembly 104.

As briefly described above, thermal imaging camera 100 includes a focus mechanism for adjusting the focus of an infrared image captured by the camera. In the example shown in FIGS. 1 and 2, thermal imaging camera 100 includes focus ring 114. Focus ring 114 is operatively coupled (e.g., mechanically and/or electrically coupled) to at least one lens of infrared lens assembly 104 and configured to move one or both of the FPA and the at least one lens to various focus positions so as to focus the infrared image captured by thermal imaging camera 100. Focus ring 114 may be manually rotated about at least a portion of housing 102 so as to move the at least one lens to which the focus ring is operatively coupled. In some examples, focus ring 114 is also operatively coupled to display 108 such that rotation of focus ring 114 causes at least a portion of a visible light image and at least a portion of an infrared image concurrently displayed on display 108 to move relative to one another. In different examples, thermal imaging camera 100 may include a manual focus adjustment mechanism that is implemented in a configuration other than focus ring 114, or may, in other embodiments, simply maintain a fixed focus.

In some examples, thermal imaging camera 100 may include an automatically adjusting focus mechanism in addition to or in lieu of a manually adjusting focus mechanism. An automatically adjusting focus mechanism may be operatively coupled to at least one lens of infrared lens assembly 104 and configured to automatically move the at least one lens to various focus positions, e.g., in response to instructions from thermal imaging camera 100. In one application of such an example, thermal imaging camera 100 may use laser 110 to electronically measure a distance between an object in a target scene and the camera, referred to as the distance-to-target. Thermal imaging camera 100 may then control the automatically adjusting focus mechanism to move the at least one lens of infrared lens assembly 104 to a focus position that corresponds to the distance-to-target data determined by thermal imaging camera 100. The focus position may correspond to the distance-to-target data in that the focus position may be configured to place the object in the target scene at the determined distance in focus. In some examples, the focus position set by the automatically adjusting focus mechanism may be manually overridden by an operator, e.g., by rotating focus ring 114.

During operation of thermal imaging camera 100, an operator may wish to view a thermal image of a scene and/or a visible light image of the same scene generated by the camera. For this reason, thermal imaging camera 100 may include a display. In the examples of FIGS. 1 and 2, thermal imaging camera 100 includes display 108, which is located on the back of housing 102 opposite infrared lens assembly 104 and visible light lens assembly 106. Display 108 may be configured to display a visible light image, an infrared image, and/or a combined image that includes a simultaneous display of the visible light image and the infrared image. In different examples, display 108 may be remote (e.g., separate) from infrared lens assembly 104 and visible light lens assembly 106 of thermal imaging camera 100, or display 108 may be in a different spatial arrangement relative to infrared lens assembly 104 and/or visible light lens assembly 106. Therefore, although display 108 is shown behind infrared lens assembly 104 and visible light lens assembly 106 in FIG. 2, other locations for display 108 are possible.

Thermal imaging camera 100 can include a variety of user input media for controlling the operation of the camera and adjusting different settings of the camera. Example control functions may include adjusting the focus of the infrared and/or visible light optics, opening/closing a shutter, capturing an infrared and/or visible light image, or the like. In the example of FIGS. 1 and 2, thermal imaging camera 100 includes a depressible trigger control 112 for capturing an infrared and visible light image, and buttons 116, which form part of the user interface, for controlling other aspects of the operation of the camera. A different number or arrangement of user input media are possible, and it should be appreciated that the disclosure is not limited in this respect. For example, thermal imaging camera 100 may include a touch screen display 108 which receives user input by depressing different portions of the screen.

Figure 3:
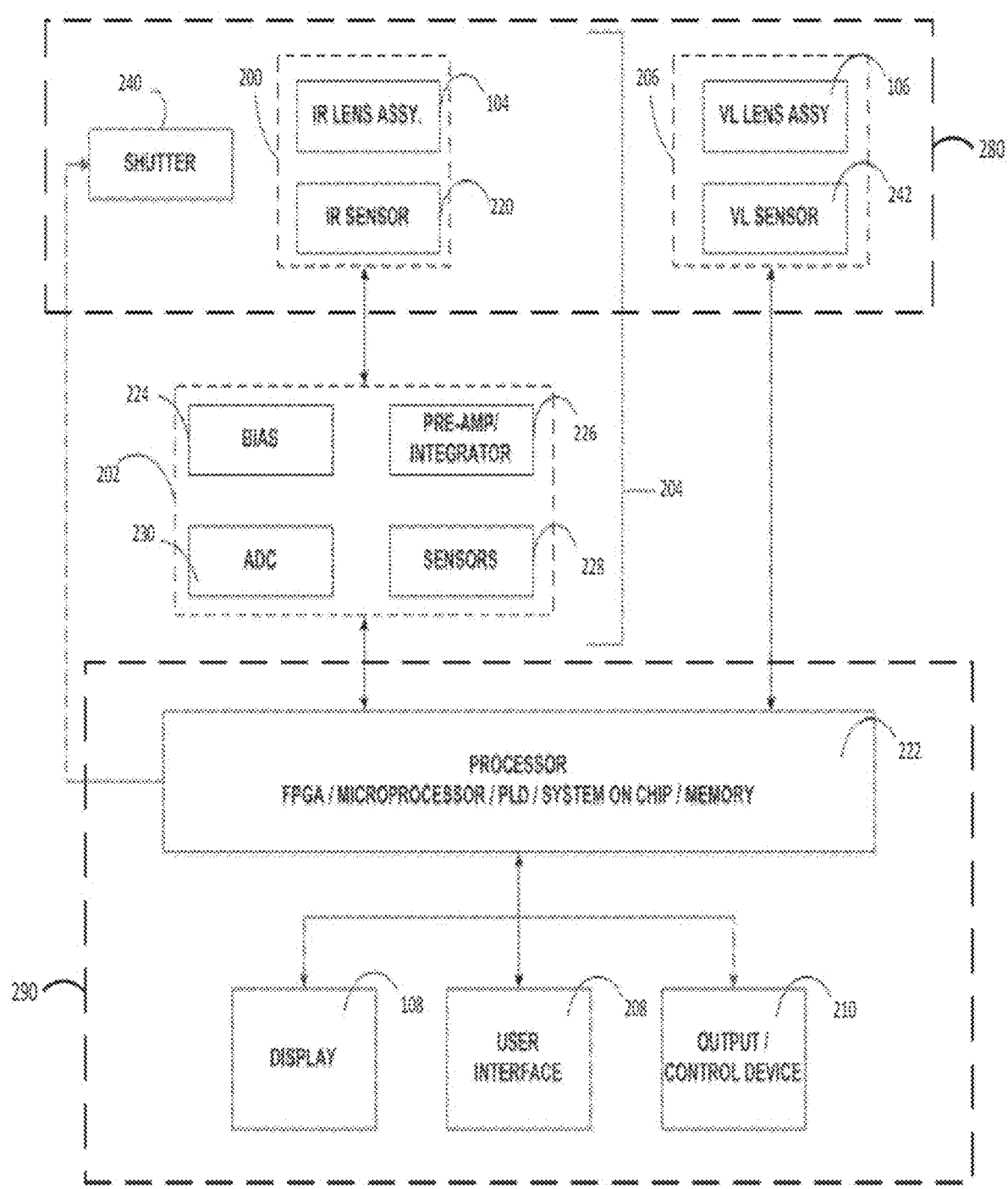
FIG. 3 is a functional block diagram illustrating example components of the thermal imaging camera of FIGS. 1 and 2.

FIG. 3 is a functional block diagram illustrating components of an example of thermal imaging camera 100. Thermal imaging camera 100 includes an IR camera module 200, front end circuitry 202. The IR camera module 200 and front end circuitry 202 are sometimes referred to in combination as front end stage or front end components 204 of the infrared camera 100. Thermal imaging camera 100 may also include a visible light camera module 206, a display 108, a user interface 208, and an output/control device 210.

Infrared camera module 200 may be configured to receive infrared energy emitted by a target scene and to focus the infrared energy on an infrared sensor for generation of infrared energy data, e.g., that can be displayed in the form of an infrared image on display 108 and/or stored in memory. Infrared camera module 200 can include any suitable components for performing the functions attributed to the module herein. In the example of FIG. 3, infrared camera module 200 is illustrated as including infrared lens assembly 104 and infrared sensor 220. As described above with respect to FIGS. 1 and 2, infrared lens assembly 104 includes at least one lens that takes infrared energy emitted by a target scene and focuses the infrared energy on infrared sensor 220. Infrared sensor 220 responds to the focused infrared energy by generating an electrical signal that can be converted and displayed as an infrared image on display 108.

Infrared sensor 220 may include one or more focal plane arrays (FPA) that generate electrical signals in response to infrared energy received through infrared lens assembly 104. Each FPA can include a plurality of infrared sensor elements including, e.g., bolometers, photon detectors, or other suitable infrared sensor elements. In operation, each sensor element, which may each be referred to as a sensor pixel, may change an electrical characteristic (e.g., voltage or resistance) in response to absorbing infrared energy received from a target scene. In turn, the change in electrical characteristic can provide an electrical signal that can be received by a processor 222 and processed into an infrared image displayed on display 108.

For instance, in examples in which infrared sensor 220 includes a plurality of bolometers, each bolometer may absorb infrared energy focused through infrared lens assembly 104 and increase in temperature in response to the absorbed energy. The electrical resistance of each bolometer may change as the temperature of the bolometer changes. With each detector element functioning as a sensor pixel, a two-dimensional image or picture representation of the infrared radiation can be further generated by translating the changes in resistance of each detector element into a time-multiplexed electrical signal that can be processed for visualization on a display or storage in memory (e.g., of a computer). Processor 222 may measure the change in resistance of each bolometer by applying a current (or voltage) to each bolometer and measure the resulting voltage (or current) across the bolometer. Based on these data, processor 222 can determine the amount of infrared energy emitted by different portions of a target scene and control display 108 to display a thermal image of the target scene.

Independent of the specific type of infrared sensor elements included in the FPA of infrared sensor 220, the FPA array can define any suitable size and shape. In some examples, infrared sensor 220 includes a plurality of infrared sensor elements arranged in a grid pattern such as, e.g., an array of sensor elements arranged in vertical columns and horizontal rows. In various examples, infrared sensor 220 may include an array of vertical columns by horizontal rows of, e.g., 16×16, 50×50, 160×120, 120×160, or 650×480. In other examples, infrared sensor 220 may include a smaller number of vertical columns and horizontal rows (e.g., 1×1), a larger number vertical columns and horizontal rows (e.g., 1000×1000), or a different ratio of columns to rows.

In certain embodiments a Read Out Integrated Circuit (ROIC) is incorporated on the IR sensor 220. The ROIC is used to output signals corresponding to each of the sensor pixels. Such ROIC is commonly fabricated as an integrated circuit on a silicon substrate. The plurality of detector elements may be fabricated on top of the ROIC, wherein their combination provides for the IR sensor 220. In some embodiments, the ROIC can include components discussed elsewhere in this disclosure (e.g. an analog-to-digital converter (ADC)) incorporated directly onto the FPA circuitry. Such integration of the ROIC, or other further levels of integration not explicitly discussed, should be considered within the scope of this disclosure.

As described above, the IR sensor 220 generates a series of electrical signals corresponding to the infrared radiation received by each infrared detector element to represent a thermal image. A "frame" of thermal image data is generated when the voltage signal from each infrared detector element is obtained by scanning all of the rows that make up the IR sensor 220. Again, in certain embodiments involving bolometers as the infrared detector elements, such scanning is done by switching a corresponding detector element into the system circuit and applying a bias voltage across such switched-in element. Successive frames of thermal image data are generated by repeatedly scanning the rows of the IR sensor 220, with such frames being produced at a rate sufficient to generate a video representation (e.g. 30 Hz, or 60 Hz) of the thermal image data.

The front end circuitry 202 includes circuitry for interfacing with and controlling the IR camera module 200. In addition, the front end circuitry 202 initially processes and transmits collected infrared image data to a processor 222 via a connection therebetween. More specifically, the signals generated by the IR sensor 220 are initially conditioned by the front end circuitry 202 of the thermal imaging camera 100. In certain embodiments, as shown, the front end circuitry 202 includes a bias generator 224 and a pre-amp/integrator 226. In addition to providing the detector bias, the bias generator 224 can optionally add or subtract an average bias current from the total current generated for each switched-in detector element. The average bias current can be changed in order (i) to compensate for deviations to the entire array of resistances of the detector elements resulting from changes in ambient temperatures inside the thermal imaging camera 100 and (ii) to compensate for array-to-array variations in the average detector elements of the IR sensor 220. Such bias compensation can be automatically controlled by the thermal imaging camera 100 or software, or can be user controlled via input to the output/control device 210 or processor 222. Following provision of the detector bias and optional subtraction or addition of the average bias current, the signals can be passed through a pre-amp/integrator 226. Typically, the pre-amp/integrator 226 is used to condition incoming signals, e.g., prior to their digitization. As a result, the incoming signals can be adjusted to a form that enables more effective interpretation of the signals, and in turn, can lead to more effective resolution of the created image. Subsequently, the conditioned signals are sent downstream into the processor 222 of the thermal imaging camera 100.

In some embodiments, the front end circuitry 202 can include one or more additional elements for example, additional sensors 228 or an ADC 230. Additional sensors 228 can include, for example, temperature sensors, visual light sensors (such as a CCD), pressure sensors, magnetic sensors, etc. Such sensors can provide additional calibration and detection information to enhance the functionality of the thermal imaging camera 100. For example, temperature sensors can provide an ambient temperature reading near the IR sensor 220 to assist in radiometry calculations. A magnetic sensor, such as a Hall Effect sensor, can be used in combination with a magnet mounted on the lens to provide lens focus position information. Such information can be useful for calculating distances, or determining a parallax offset for use with visual light scene data gathered from a visual light sensor.

An ADC 230 can provide the same function and operate in substantially the same manner as discussed below, however its inclusion in the front end circuitry 202 may provide certain benefits, for example, digitization of scene and other sensor information prior to transmittal to the processor 222 via the connection therebetween. In some embodiments, the ADC 230 can be integrated into the ROIC, as discussed above, thereby eliminating the need for a separately mounted and installed ADC 230.

In some embodiments, front end components can further include a shutter 240. A shutter 240 can be externally or internally located relative to the lens and operate to open or close the view provided by the IR lens assembly 104. As is known in the art, the shutter 240 can be mechanically positionable, or can be actuated by an electro-mechanical device such as a DC motor or solenoid. Embodiments of the invention may include a calibration or setup software implemented method or setting which utilize the shutter 240 to establish appropriate bias levels for each detector element.

Components described as processors within thermal imaging camera 100, including processor 222, may be implemented as one or more processors, such as one or more microprocessors, digital signal processors (DSPs), application specific integrated circuits (ASICs), field programmable gate arrays (FPGAs), programmable logic circuitry, or the like, either alone or in any suitable combination. Processor 222 may also include memory that stores program instructions and related data that, when executed by processor 222, cause thermal imaging camera 100 and processor 222 to perform the functions attributed to them in this disclosure. Memory may include any fixed or removable magnetic, optical, or electrical media, such as RAM, ROM, CD-ROM, hard or floppy magnetic disks, EEPROM, or the like. Memory may also include a removable memory portion that may be used to provide memory updates or increases in memory capacities. A removable memory may also allow image data to be easily transferred to another computing device, or to be removed before thermal imaging camera 100 is used in another application. Processor 222 may also be implemented as a System on Chip that integrates some or all components of a computer or other electronic system into a single chip. These elements manipulate the conditioned scene image data delivered from the front end stages 204 in order to provide output scene data that can be displayed or stored for use by the user. Subsequently, the processor 222 (processing circuitry) sends the processed data to a display 108 or other output/control device 210.

During operation of thermal imaging camera 100, processor 222 can control infrared camera module 200 to generate infrared image data for creating an infrared image. Processor 222 can generate a digital "frame" of infrared image data. By generating a frame of infrared image data, processor 222 captures an infrared image of a target scene at substantially a given point in time. That is, in some examples, a plurality of pixels making up the infrared image may be captured simultaneously. In other embodiments, sets of one or more pixels may be captured serially until each pixel has been captured.

Processor 222 can capture a single infrared image or "snap shot" of a target scene by measuring the electrical signal of each infrared sensor element included in the FPA of infrared sensor 220 a single time. Alternatively, processor 222 can capture a plurality of infrared images of a target scene by repeatedly measuring the electrical signal of each infrared sensor element included in the FPA of infrared sensor 220. In examples in which processor 222 repeatedly measures the electrical signal of each infrared sensor element included in the FPA of infrared sensor 220, processor 222 may generate a dynamic thermal image (e.g., a video representation) of a target scene. For example, processor 222 may measure the electrical signal of each infrared sensor element included in the FPA at a rate sufficient to generate a video representation of thermal image data such as, e.g., 30 Hz or 60 Hz. Processor 222 may perform other operations in capturing an infrared image such as sequentially actuating a shutter 240 to open and close an aperture of infrared lens assembly 104, or the like.

With each sensor element of infrared sensor 220 functioning as a sensor pixel, processor 222 can generate a two-dimensional image or picture representation of the infrared radiation from a target scene by translating changes in an electrical characteristic (e.g., resistance) of each sensor element into a time-multiplexed electrical signal that can be processed, e.g., for visualization on display 108 and/or storage in memory. When displayed on a display 108, an infrared image can comprise a plurality of display pixels. Display pixels can have any defined relationship with corresponding sensor pixels. In some examples, each sensor pixel corresponds to a display pixel in an image representation of infrared data. In other examples, a plurality of sensor pixels may be combined (e.g., averaged) to provide infrared information for a single display pixel. In still other examples, a single sensor pixel may contribute to a plurality of display pixels. For example, a value from a single sensor pixel may be replicated at nearby pixels, such as in a simple upsampling procedure. In other examples, neighboring or otherwise nearby pixels may be averaged to create a new pixel value, such as in an interpolation procedure. Because relationships between display pixels and sensor pixels are defined with respect to camera operation, the generic term "pixel" may refer to the sensor pixel, the display pixel, or the data as it is processed from the sensor pixel to the display pixel unless otherwise stated. Processor 222 may perform computations to convert raw infrared image data into scene temperatures (radiometry) including, in some examples, colors corresponding to the scene temperatures.

Processor 222 may control display 108 to display at least a portion of an infrared image of a captured target scene. In some examples, processor 222 controls display 108 so that the electrical response of each sensor element of infrared sensor 220 is associated with a single pixel on display 108. In other examples, processor 222 may increase or decrease the resolution of an infrared image so that there are more or fewer pixels displayed on display 108 than there are sensor elements in infrared sensor 220. Processor 222 may control display 108 to display an entire infrared image (e.g., all portions of a target scene captured by thermal imaging camera 100) or less than an entire infrared image (e.g., a lesser port of the entire target scene captured by thermal imaging camera 100). Processor 222 may perform other image processing functions, as described in greater detail below.

Independent of the specific circuitry, thermal imaging camera 100 may be configured to manipulate data representative of a target scene so as to provide an output that can be displayed, stored, transmitted, or otherwise utilized by a user.

Thermal imaging camera 100 includes visible light camera module 206. Visible light camera modules are generally well known. For examples, various visible light camera modules are included in smartphones and numerous other devices. In some embodiments, visible light camera module 206 may be configured to receive visible light energy from a target scene and to focus the visible light energy on a visible light sensor for generation of visible light energy data, e.g., that can be displayed in the form of a visible light image on display 108 and/or stored in memory. Visible light camera module 206 can include any suitable components for performing the functions attributed to the module herein. In the example of FIG. 3, visible light camera module 206 is illustrated as including visible light lens assembly 106 and visible light sensor 242. As described above with respect to FIGS. 1 and 2, visible light lens assembly 106 includes at least one lens that takes visible light energy emitted by a target scene and focuses the visible light energy on visible light sensor 242. Visible light sensor 242 responds to the focused energy by generating an electrical signal that can be converted and displayed as a visible light image on display 108. In some examples, the visible light module 206 is configurable by a user, and can provide output, for example, to display 108, in a variety of formats. Visible light camera module 206 may include compensation functionality for varying lighting or other operating conditions or user preferences. The visible light camera module may provide a digital output including image data, which may include data in a variety of formats (e.g., RGB, CYMK, YCbCr, etc.).

Visible light sensor 242 may include a plurality of visible light sensor elements such as, e.g., CMOS detectors, CCD detectors, PIN diodes, avalanche photo diodes, or the like. The number of visible light sensor elements may be the same as or different than the number of infrared light sensor elements.

In operation, optical energy received from a target scene may pass through visible light lens assembly 106 and be focused on visible light sensor 242. When the optical energy impinges upon the visible light sensor elements of visible light sensor 242, photons within the photodetectors may be released and converted into a detection current. Processor 222 can process this detection current to form a visible light image of the target scene.

During use of thermal imaging camera 100, processor 222 can control visible light camera module 206 to generate visible light data from a captured target scene for creating a visible light image. The visible light data may include luminosity data indicative of the color(s) associated with different portions of the captured target scene and/or the magnitude of light associated with different portions of the captured target scene. Processor 222 can generate a "frame" of visible light image data by measuring the response of each visible light sensor element of thermal imaging camera 100 a single time. By generating a frame of visible light data, processor 222 captures visible light image of a target scene at a given point in time. Processor 222 may also repeatedly measure the response of each visible light sensor element of thermal imaging camera 100 so as to generate a dynamic thermal image (e.g., a video representation) of a target scene, as described above with respect to infrared camera module 200. In some examples, the visible light camera module 206 may include its own dedicated processor or other circuitry (e.g., ASIC) capable of operating the visible light camera module 206. In some such embodiments, the dedicated processor is in communication with processor 222 for providing visible light image data (e.g., RGB image data) to processor 222. In alternative embodiments, a dedicated processor for the visible light camera module 206 may be integrated into processor 222.

With each sensor element of visible light camera module 206 functioning as a sensor pixel, processor 222 can generate a two-dimensional image or picture representation of the visible light from a target scene by translating an electrical response of each sensor element into a time-multiplexed electrical signal that can be processed, e.g., for visualization on display 108 and/or storage in memory.

Processor 222 may control display 108 to display at least a portion of a visible light image of a captured target scene. In some examples, processor 222 controls display 108 so that the electrical response of each sensor element of visible light camera module 206 is associated with a single pixel on display 108. In other examples, processor 222 may increase or decrease the resolution of a visible light image so that there are more or fewer pixels displayed on display 108 than there are sensor elements in visible light camera module 206. Processor 222 may control display 108 to display an entire visible light image (e.g., all portions of a target scene captured by thermal imaging camera 100) or less than an entire visible light image (e.g., a lesser port of the entire target scene captured by thermal imaging camera 100).

In some embodiments, one or both of infrared 200 and visible light 206 camera modules for acquiring IR and VL image data may be included in an image acquisition module 280. The image acquisition module may be in wired or wireless communication with a processing module 290 that includes a processor such as 222. Processing module 290 may receive image data from the image acquisition module 280 and perform subsequent processing steps as will be described herein. In some examples, processing module 290 may include portable processing devices, such as a smartphone, a tablet, a stand-alone computer such as a laptop or desktop PC, or the like. In some such embodiments, various components of front end circuitry 202 may be included in the image acquisition module 280, the processing module 290, or both.

In these and other examples, processor 222 may control display 108 to concurrently display at least a portion of the visible light image captured by thermal imaging camera 100 and at least a portion of the infrared image captured by thermal imaging camera 100. Such a concurrent display may be useful in that an operator may reference the features displayed in the visible light image to help understand the features concurrently displayed in the infrared image, as the operator may more easily recognize and distinguish different real-world features in the visible light image than the infrared image. In various examples, processor 222 may control display 108 to display the visible light image and the infrared image in side-by-side arrangement, in a picture-in-picture arrangement, where one of the images surrounds the other of the images, or any other suitable arrangement where the visible light and the infrared image are concurrently displayed.

For example, processor 222 may control display 108 to display the visible light image and the infrared image in a combined arrangement. In such an arrangement, for a pixel or set of pixels in the visible light image representative of a portion of the target scene, there exists a corresponding pixel or set of pixels in the infrared image, representative of substantially the same portion of the target scene. In various embodiments, the size and/or resolution of the IR and VL images need not be the same. Accordingly, there may exist a set of pixels in one of the IR or VL images that correspond to a single pixel in the other of the IR or VL image, or a set of pixels of a different size. Similarly, there may exist a pixel in one of the VL or IR images that corresponds to a set of pixels in the other image. Thus, as used herein, corresponding does not require a one-to-one pixel relationship, but may include mismatched sizes of pixels or groups of pixels. Various combination techniques of mismatched sized regions of images may be performed, such as up- or down-sampling one of the images, or combining a pixel with the average value of a corresponding set of pixels. Other examples are known and are within the scope of this disclosure.

Thus, corresponding pixels need not have a direct one-to-one relationship. Rather, in some embodiments, a single infrared pixel has a plurality of corresponding visible light pixels, or a visible light pixel has a plurality of corresponding infrared pixels. Additionally or alternatively, in some embodiments, not all visible light pixels have corresponding infrared pixels, or vice versa. Such embodiments may be indicative of, for example, a picture-in-picture type display as previously discussed. Thus, a visible light pixel will not necessarily have the same pixel coordinate within the visible light image as does a corresponding infrared pixel. Accordingly, as used herein, corresponding pixels generally refers pixels from any image (e.g., a visible light image, an infrared image, a combined image, a display image, etc.) comprising information from substantially the same portion of the target scene. Such pixels need not have a one-to-one relationship between images and need not have similar coordinate positions within their respective images.

Similarly, images having corresponding pixels (i.e., pixels representative of the same portion of the target scene) can be referred to as corresponding images. Thus, in some such arrangements, the corresponding visible light image and the infrared image may be superimposed on top of one another, at corresponding pixels. An operator may interact with user interface 208 to control the transparency or opaqueness of one or both of the images displayed on display 108. For example, the operator may interact with user interface 208 to adjust the infrared image between being completely transparent and completely opaque and also adjust the visible light image between being completely transparent and completely opaque. Such an exemplary combined arrangement, which may be referred to as an alpha-blended arrangement, may allow an operator to adjust display 108 to display an infrared-only image, a visible light-only image, of any overlapping combination of the two images between the extremes of an infrared-only image and a visible light-only image. Processor 222 may also combine scene information with other data, such as radiometric data, alarm data, and the like. In general, an alpha-blended combination of visible light and infrared images can comprise anywhere from 100 percent infrared and 0 percent visible light to 0 percent infrared and 100 percent visible light. In some embodiments, the amount of blending can be adjusted by a user of the camera. Thus, in some embodiments, a blended image can be adjusted between 100 percent visible light and 100 percent infrared.

Additionally, in some embodiments, the processor 222 can interpret and execute commands from user interface 208, and/or output/control device 210. This can involve processing of various input signals and transferring those signals to the front end circuitry 202 via a connection therebetween. Components (e.g. motors, or solenoids) proximate the front end circuitry 202 can be actuated to accomplish the desired control function. Exemplary control functions can include adjusting the focus, opening/closing a shutter, triggering sensor readings, adjusting bias values, etc.

Moreover, input signals may be used to alter the processing of the image data that occurs in the processor 222.

Processor can further include other components to assist with the processing and control of the infrared imaging camera 100. For example, as discussed above, in some embodiments, an ADC can be incorporated into the processor 222. In such a case, analog signals conditioned by the front-end stages 204 are not digitized until reaching the processor 222. Moreover, some embodiments can include additional on board memory for storage of processing command information and scene data, prior to transmission to the display 108 or the output/control device 210.

An operator may interact with thermal imaging camera 100 via user interface 208, which may include buttons, keys, or another mechanism for receiving input from a user. The operator may receive output from thermal imaging camera 100 via display 108. Display 108 may be configured to display an infrared-image and/or a visible light image in any acceptable palette, or color scheme, and the palette may vary, e.g., in response to user control. In some examples, display 108 is configured to display an infrared image in a monochromatic palette such as grayscale. In other examples, display 108 is configured to display an infrared image in a color palette such as, e.g., amber, ironbow, blue-red, or other high contrast color scheme. Combinations of grayscale and color palette displays are also contemplated. In some examples, the display being configured to display such information may include processing capabilities for generating and presenting such image data. In other examples, being configured to display such information may include the ability to receive image data from other components, such as processor 222. For example, processor 222 may generate values (e.g., RGB values, grayscale values, or other display options) for each pixel to be displayed. Display 108 may receive such information and map each pixel into a visual display.

While processor 222 can control display 108 to concurrently display at least a portion of an infrared image and at least a portion of a visible light image in any suitable arrangement, a picture-in-picture arrangement may help an operator to easily focus and/or interpret a thermal image by displaying a corresponding visible image of the same scene in adjacent alignment.

A power supply (not shown) delivers operating power to the various components of thermal imaging camera 100 and, in some examples, may include a rechargeable or non-rechargeable battery and a power generation circuit.

During operation of thermal imaging camera 100, processor 222 controls infrared camera module 200 and visible light camera module 206 with the aid of instructions associated with program information that is stored in memory to generate a visible light image and an infrared image of a target scene. Processor 222 further controls display 108 to display the visible light image and/or the infrared image generated by thermal imaging camera 100.

Figure 4A:
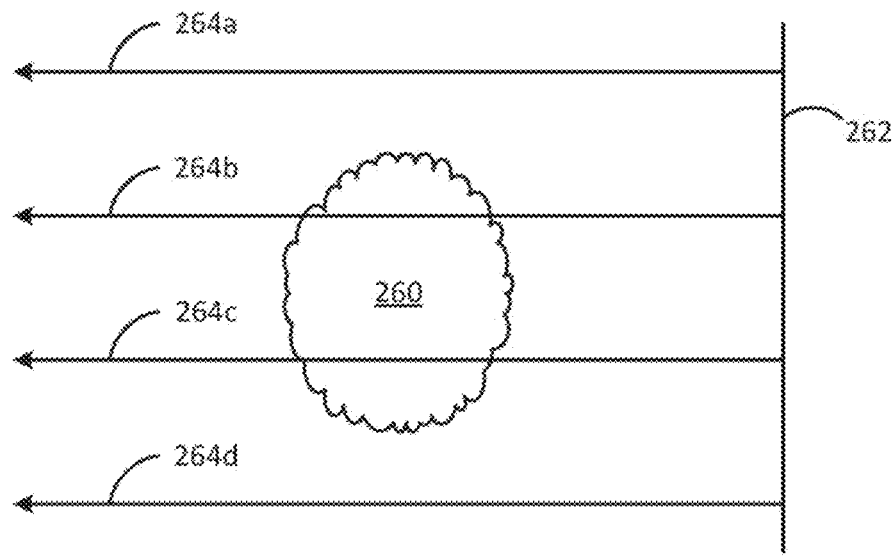
FIGS. 4A and 4B show schematic illustrations of a gas impacting a thermal image.
Figure 4B:
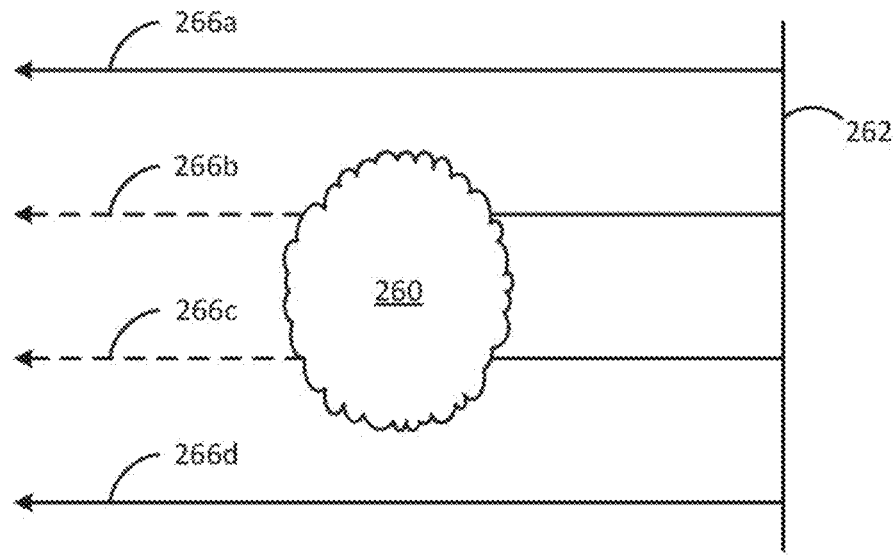

In some cases, thermal imaging cameras can be used for detecting the presence of infrared-absorbing gases in a scene. FIGS. 4A and 4B show schematic illustrations of a gas impacting a thermal image. FIG. 4A shows a gas cloud 260 and a source 262 of infrared radiation. Beams 264a-264d represent infrared radiation from source 262 at a wavelength of light that is not substantially absorbed by the gas in gas cloud 260. FIG. 4B similarly shows a gas cloud 260 and a source 262 of infrared radiation. Beams 266a-266d represent infrared radiation from source 262 at a wavelength of light that is absorbed by the gas in gas cloud 260. As shown in the illustrative example of FIG. 4B using broken lines, after passing through gas cloud 260, the beams 266b and 266c are attenuated by absorption by the gas while beams 266a and 266d, which do not pass through gas cloud 260, are unaffected. It will be appreciated that, while described as radiation being "attenuated" by a gas cloud (e.g., 260), in some instances, the gas cloud can augment radiation of a certain wavelength. For example, in an environment in which a gas is at a higher temperature than the background scene, the gas can add to (augment) radiation at one or more wavelengths with respect to the background scene rather than attenuate such wavelengths.

Figure 5A:
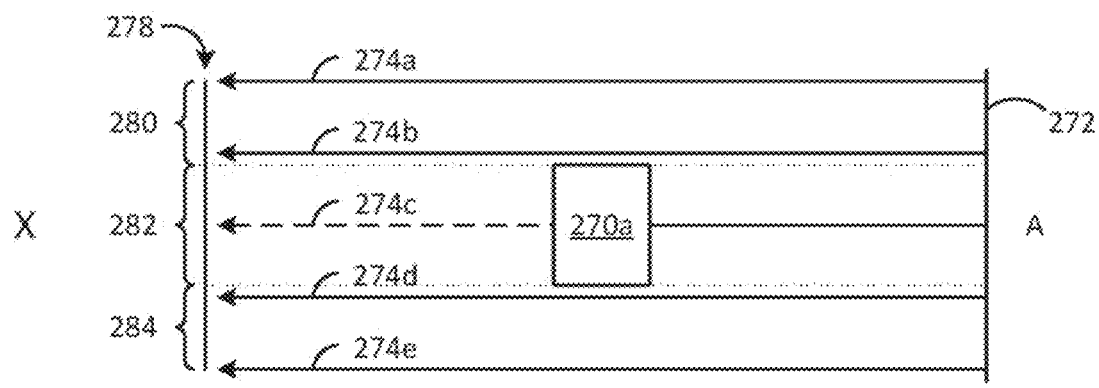
FIGS. 5A-5C schematically show how infrared imaging can detect the presence of gas in a target scene.
Figure 5B:
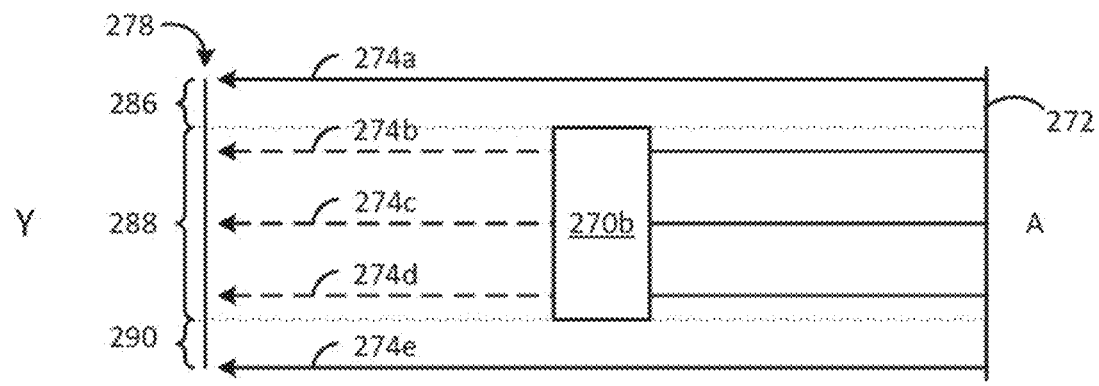
Figure 5C:
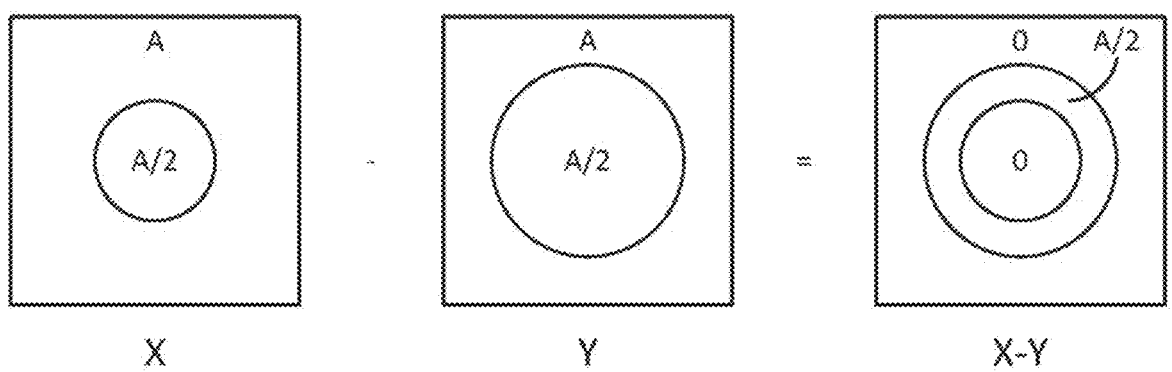

FIGS. 5A-5C schematically show how infrared imaging can detect the presence of gas in a target scene. FIG. 5A shows a source 272 of infrared radiation emitting at a particular wavelength and having uniform amplitude A. Beams 274a, 274b, 274d, and 274e of infrared radiation do not pass through gas cloud 270a, while beam 274c passes through gas cloud 270a. In the illustrated example, the gas cloud 270a attenuates the wavelength by a factor of 2. Thus, at plane 278, the amount of radiation received at regions 280 and 284 emitted by source 272 will still have amplitude A, while the amount of radiation received at region 282 will have amplitude A/2, since the radiation was attenuated by gas cloud 270a. An infrared image X taken at plane 278 would include regions (280, 284) having amplitude A and other regions (282) with amplitude A/2.

FIG. 5B similarly shows a source 272 of infrared radiation emitting at a particular wavelength and having uniform amplitude A, however the gas cloud 270b in FIG. 5B is larger than that in FIG. 5A (e.g., due to the gas expanding). In this case, beams 274a and 274e of infrared radiation do not pass through gas cloud 270b, while beams 274b-274d pass through gas cloud 270b. Since the gas cloud 270b attenuates the wavelength from the source 272 by a factor of 2, the amount of radiation received at regions 286 and 290 will still have amplitude A, while the amount of radiation received at region 288 will have amplitude A/2. An infrared image Y taken at plane 278 would include regions (286, 290) having amplitude A and other regions (288) with amplitude A/2.

If source 272 emitted only the wavelength attenuated by the gas cloud (270a, 270b) at uniform amplitude A, either image X (FIG. 5A) or Y (FIG. 5B) would show the presence of the gas cloud, due to the difference in radiation received at plane 278. For example, FIG. 5C shows image X having a region with amplitude A and a region attenuated by gas cloud 270a having amplitude A/2. Similarly, image Y includes a region with amplitude A and a region attenuated by gas cloud 270b having amplitude A/2. However, if the source 272 emits additional infrared radiation, such as a typical blackbody, attenuation (or augmentation) of a single wavelength or narrow waveband within the image data would not necessarily be apparent in either image X or Y alone. That is, the attenuation or augmentation of the radiation wavelength(s) would not necessarily produce a noticeable amount of contrast in the image, since the attenuation or augmentation of a small waveband due to the gas may be small compared to the overall radiation amplitude in the image. Thus, in a general gas imaging process, a gas cloud can generally affect the radiation of a wavelength or band of wavelengths due received from a target scene due to attenuation or augmentation of the radiation.

However, a difference image X-Y taken by subtracting one image from the other will eliminate any constant background data not attenuated by the gas cloud (270a, 270b). In such an image, the region attenuated by the gas cloud in one image (Y) but not in the other image (X) will appear as a non-zero region (in this case, A/2) in the difference image X-Y, thus indicating at least the presence of gas in the scene. Thus, in some instances, such a difference image can comprise an optical gas image, which can be used to identify a current state of a gas cloud. That is, in some instances, an optical gas image can be generated by determining the difference between a current scene (a "foreground" image) showing the effect of a current gas and a historical scene (a "background" image) showing image data reflecting a previous effect of the gas. With a stationary camera, fixed components in the scene (e.g., non-gas) are likely to be substantially the same in the foreground image and the background, but the gas cloud will have likely evolved and/or moved. Thus, the optical gas image, being generated using the difference between the foreground image and the background image, will include regions in which impact of the gas on the received radiation (e.g., attenuation or augmentation) has changed between the images, but contribution from the fixed components will be absent, since such contribution is present in both the foreground and background image.

It will be appreciated that the example described with respect to FIGS. 5A-5C is a simplified example illustrating the concept of gas imaging using the absorption properties of the gas relative to at least one infrared wavelength. However, in various examples, the impact on the received radiation by a gas cloud will depend on the size (e.g., path thickness) and density of the gas cloud, neither of which is necessarily constant throughout a gas cloud. Thus, the degree and shape of the attenuation or augmentation from a gas cloud can vary within a scene as the gas cloud changes shape over time.

One common way to achieve a gas-detection image is to generally perform the step illustrated in FIG. 5C, in which an image taken at one time (the foreground image) is subtracted from an image taken at an earlier time (the background image). The difference in the image will be representative of any changes in the target scene, and since a gas cloud is constantly changing, the gas cloud appears in the image. One way this image subtraction can be performed is by subtracting two images from within a scene buffer, for example, subtracting the earliest image in a buffer from the most-recently acquired image in the buffer.

Figure 6:
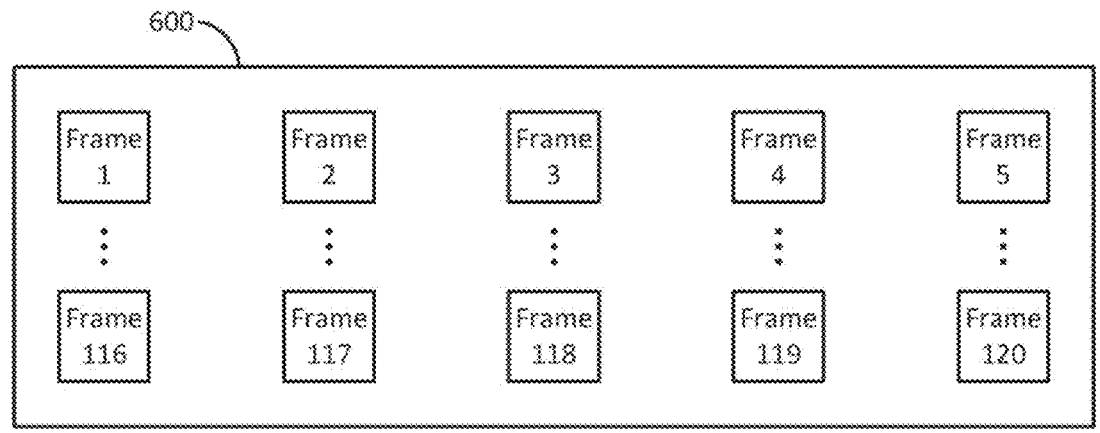
FIG. 6 is a schematic illustration of a plurality of image frames captured in a frame buffer.

FIG. 6 is a schematic illustration of a plurality of image frames captured in a frame buffer. As shown, 120 images (Frame 1-Frame 120) are present in the frame buffer 600. In an exemplary embodiment, the 120 images in FIG. 6 can represent 120 frames in a two second buffer acquired at a framerate of 60 Hz. In such an example, Frame 120 is taken approximately two seconds after Frame 1. Thus, subtracting Frame 1 (the historical, "background" image) from Frame 120 (the more recent, "foreground" image) would yield an optical gas image showing changes in the scene over approximately a two second timeframe, which could show the presence of an evolving gas cloud within the target scene. Each time a frame in the buffer 600 is replaced (e.g., Frame 1 is replaced with Frame 121), the first and last frames (now Frame 2 and Frame 121) can be compared to generate a new optical gas image. Thus, the optical gas image can be updated at the same framerate as the images are acquired.

As described, the effect of a gas cloud on the infrared radiation from a scene that reaches an imaging plane in a thermal camera is dependent on several features, such as the amount and density of the gas. Additionally, a typical target scene will emit a broad span of infrared wavelengths, some of which will be absorbed or emitted by a gas to a greater degree than others, and the impact on received radiation due to the gas may be very small. As a result, the changes in an image due to the presence of or changes in a gas cloud may be below the noise threshold of a thermal camera. That is, without a sufficiently high signal to noise ratio in a thermal camera, noise (e.g., due to sensor/electronics drift, thermal fluctuations, component self-heating or other factors) may obscure subtle changes in the image due to gas, making gas recognition impossible or impractical.

Accordingly, reducing the noise in the infrared images used to observe and/or detect gas can increase the ability to resolve gas from noise in the thermal scene. Some ways of reducing noise in the scene include using a high-sensitivity camera sensor or FPA, such as in a cryo-cooled infrared camera. However, such equipment can be costly and difficult or inconvenient to use. For example, such equipment can be bulky, difficult to carry and/or maneuver, can require extended operating time (e.g., cool down times), and the like.

Other techniques to improve the signal to noise ratio of the image data used in establishing a gas image includes generating averages of the image data to reduce the noise present in the foreground and/or background images. For instance, in an exemplary embodiment, with reference to FIG. 6, images 1-5 can be averaged together to create a filtered background image, while images 116-120 can be averaged to create a filtered foreground image. This generally reduces the noise in the foreground and background images by a factor of $\sqrt{5}$ (the square root of the number of averaged frames). The difference between the filtered foreground image and the filtered background image would represent changes in the scene (e.g., in the size, density, etc. of a gas cloud) with reduced noise, such that smaller changes in the scene can be observed due to reduced noise.

In general, any of a variety of averaging and/or filtering techniques can be employed to reduce the noise in the foreground and background images used to create an optical gas image. In some embodiments, as described above, the filtered foreground image can be generated from an average of a first plurality of frames while the filtered background image can be generated from an average of a second plurality of frames. In some such examples, the first plurality of frames and the second plurality of frames can be entirely distinct from one another (e.g., Frames 1-5 and Frames 120 as described above). In other examples, the first plurality of frames and the second plurality of frames at least partially overlap. In some embodiments, the median frame in the first plurality of images is captured at a more recent time than the median frame in the second plurality of images. Thus, the filtered foreground image will be generally representative of a more recent point in time than the filtered background image.

In some examples, the filtered foreground and/or filtered background images are calculated using a traditional average taken across the first and second plurality of frames, respectively. If performing a traditional average of a plurality of frames, then the first plurality of images and the second plurality of images cannot be the same plurality of images, since otherwise subtracting the filtered foreground image and filtered background image would result in a blank image.

In other examples, averaging a plurality of frames can include performing a weighted average of the plurality of frames. For example, in calculating an average of a plurality of frames, greater weight can be placed on more recent frames, less recent frames, or based on any of a variety of parameters. Such weighted averaging can be performed on first and second pluralities of frames in order to generate a filtered foreground and background image, respectively. In some examples, when using a weighted average, the first and second plurality of images can be the same plurality of images. For example, in some embodiments, the filtered background image can be calculated from a weighted average of a plurality of frames wherein frames captured earlier are weighted more heavily than are frames that were captured at a later time. Similarly, the filtered foreground image can be calculated from a weighted average of the same plurality of frames wherein frames that were captured later in time are weighted more heavily than are frames that were captured earlier in time. Thus, the filtered background image generally represents an averaged target scene at an earlier time than does the filtered foreground image.

Equations (1) and (2) show a simplified technique for performing a weighted average on a single plurality of N images to calculate a filtered foreground image and a filtered background image. For example, with respect to Equations (1) and (2) a plurality of images includes N frames $F_1, F_2, \ldots, F_N$, wherein image $F_1$ is the frame in the plurality that was captured at the earliest time and frame $F_N$ is the frame captured at the most recent point in time.

$$F_{background} \propto \sum_{n=1}^{N} \left(\frac{1}{n}\right) F_n \quad (1)$$

$$F_{foreground} \propto \sum_{n=1}^{N} \left(\frac{1}{N-n+1}\right) F_n \quad (2)$$

As shown, according to Equation (1), in calculating the filtered background image $F_{background}$, earlier images contribute to the average much more than the later images. Similarly, according to Equation (2), in calculating the filtered foreground image, $F_{foreground}$, later images contribute to the average much more than the earlier images. Equations (1) and (2) illustrate one exemplary process of how images captured at different times can be weighted differently in generating filtered foreground and background images. It will be appreciated that many possible forms of averaging are possible in order to generally average a single plurality of images using different weighting techniques to generate different foreground and background images. Exemplary processes for combining a plurality of buffer frames to generate filtered foreground and background images can include applying one or more finite impulse response (FIR) filters to a plurality of images within the buffer.

With respect to FIG. 6, in some examples, all frames in a buffer 600 can be averaged together to create foreground and background images for use in an optical gas imaging process. For example, Frames 1-120 can be averaged together via a first averaging technique, such as using Equation (1), to calculate a filtered background image. Similarly, Frames 1-120 can be averaged together via a second averaging technique, such as using Equation (2), to calculate a filtered foreground image. As described elsewhere herein, an optical gas image can be calculated by comparing the filtered foreground and background images, such as via subtraction $F_{foreground} - F_{background}$, and displayed. The optical gas image can show a representation of a gas cloud as it changes over time in the target scene as described elsewhere herein.

In some examples, processing frames from a frame buffer may require an undesired amount of memory and/or processing capability in order to adequately perform certain imaging techniques. For example, in the exemplary embodiment described with respect to FIG. 6, to process and display an essentially "real-time" optical gas image to illustrate the presence of gas in a target scene, a camera requires memory to include 120 frames in a buffer 600. Such a camera would also require sufficient processing power to perform calculations including up to all 120 frames twice in order to calculate both the filtered foreground and filtered background images fast enough to continually calculate and present optical gas images to show a substantially "real-time" updating image. Such requirements can increase the cost and complexity of a camera.

Figure 7:
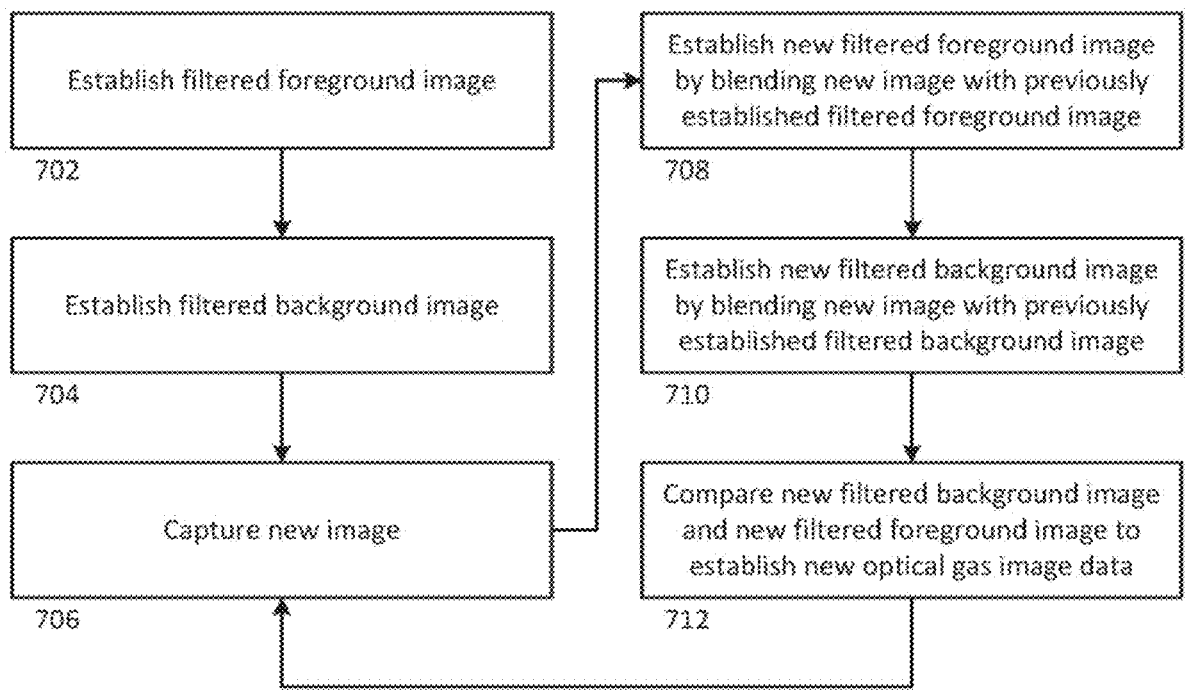
FIG. 7 is a process flow diagram illustrating an exemplary process for generating and updating filtered foreground and background for continued updating of an optical gas image.

In some embodiments, alternative techniques can be performed for determining filtered background and foreground images for calculating an optical gas image that can be used to identify a gas cloud in an imaged scene. FIG. 7 is a process flow diagram illustrating an exemplary process for generating and updating filtered foreground and background images for continued updating of an optical gas image. The process includes the steps of establishing a filtered foreground image (702) and establishing a filtered background image (704). This can include, for example, capturing a single frame and calling the frame both the filtered foreground image and the filtered background image. In other examples, a first image can be captured and established as the filtered background frame and a second image can subsequently be captured and established as the filtered foreground frame. In either case, after each of the filtered foreground image (702) and filtered background (704) images are established, as each image is updated via the process of FIG. 7, non-zero differences will generally be present between the filtered foreground and background images during subsequent iterations of the method of FIG. 7.

At this point, two images are stored in memory—a filtered foreground image and a filtered background image. Next, a new image is captured (706). The process includes the steps of establishing a new filtered foreground image by blending the new image captured at step 706 with the previously established filtered foreground image (708). Similarly, the method includes the step of establishing a new filtered background image by blending the new image captured at step 706 with the previously established filtered background image (710). Steps 708 and 710 effectively average the new frame with previous data acting to update each of the filtered foreground and background images by incorporating new image data while maintaining the noise-reduction benefits of filtering/averaging the images.

According to the method of FIG. 7, the new filtered foreground image (from step 708) and the new filtered background image (from step 710) are compared to establish a new optical gas image (712). As described elsewhere herein, comparing the foreground and background images can include subtracting one image from the other. Generally, since changes in the image data are what ultimately represent gas in the image, the optical gas image can be calculated by determining the absolute value of the difference between the background and foreground images or by subtracting either of the foreground image and the background image from the other.

After establishing a new optical gas image (712), a new image is captured (706). The new image is blended with the previously established filtered foreground image (from the previous iteration through the method) to establish yet another new filtered foreground image (708). Similarly, the new image is blended with the previously established filtered background image (from the previous iteration through the method) to establish yet another new filtered background image (710). The new foreground and background images can be compared to establish yet another new optical gas image (712).

In some examples, steps in the process of FIG. 7 can be performed sequentially, such as establishing initial and new filtered foreground and background images. In other examples, some such steps can be performed in parallel. For example, in some embodiments, filtered foreground and filtered background images can be processed and updated in parallel with one another. In an exemplary embodiment, steps 702 and 704 are performed in parallel.

Additionally or alternatively, steps 708 and 710 are performed in parallel. In some such examples, filtered foreground and filtered background images can be generated and updated in parallel before being compared to establish new optical gas image data (712).

In some examples, blending the new image with a previous background or foreground image to recursively update the filtered background and/or foreground image can be performed using one or more infinite impulse response (IIR) filters. In some such examples, the new image and the previous image are weighted by a scaling factor and combined. Equations 3 and 4 provide exemplary calculations for blending a new image with previous foreground and background images to calculate new foreground and background images, respectively, according to an exemplary first order IIR filter.

$$F_{foreground} = (\alpha_{foreground}) \times (F_{new}) + (\beta_{foreground}) \times (F_{prev\_foreground}) \quad (3)$$

$$F_{background} = (\alpha_{background}) \times (F_{new}) + (\beta_{background}) \times (F_{prev\_background}) \quad (4)$$

wherein $$\alpha_{foreground} + \beta_{foreground} = 1$$

and $$\alpha_{background} + \beta_{background} = 1$$

As shown in Equation 3, the updated foreground image, $F_{foreground}$, is a blend of a new image, $F_{new}$, and a previous foreground image, $F_{prev\_foreground}$. The new image is scaled by a factor of $\alpha_{foreground}$, while the previous foreground image is scaled by a factor of $\beta_{foreground}$. Similarly, the updated background image, $F_{background}$, is a blend of the new image, $F_{new}$, and a previous background image, $F_{prev\_background}$. The new image is scaled by a factor of $\alpha_{background}$, while the previous background image is scaled by a factor of $\beta_{background}$.

It will be appreciated that, while referred to as an infinite impulse response filter, in some examples, due to the limited calculation accuracy (e.g., in digital processing), a contribution from a previous image after several iterations of the filter may amount to zero in a digital filtering process. That is, if a value become sufficiently small compared to the calculation precision, the value may effectively become to zero due to processing limitations. Thus, in some embodiments, an image taken during an IIR filtering process may not in practice contribute to a filtered background or foreground image after a sufficiently high number of iterations of the IIR filter. However, as used herein, an infinite impulse response (IIR) filter will also encompass such filters in which such values may become zero beyond a certain number of iterations due to calculation precision limitations, but conceptually would not necessarily become exactly zero with infinite calculation accuracy.

Figure 8:
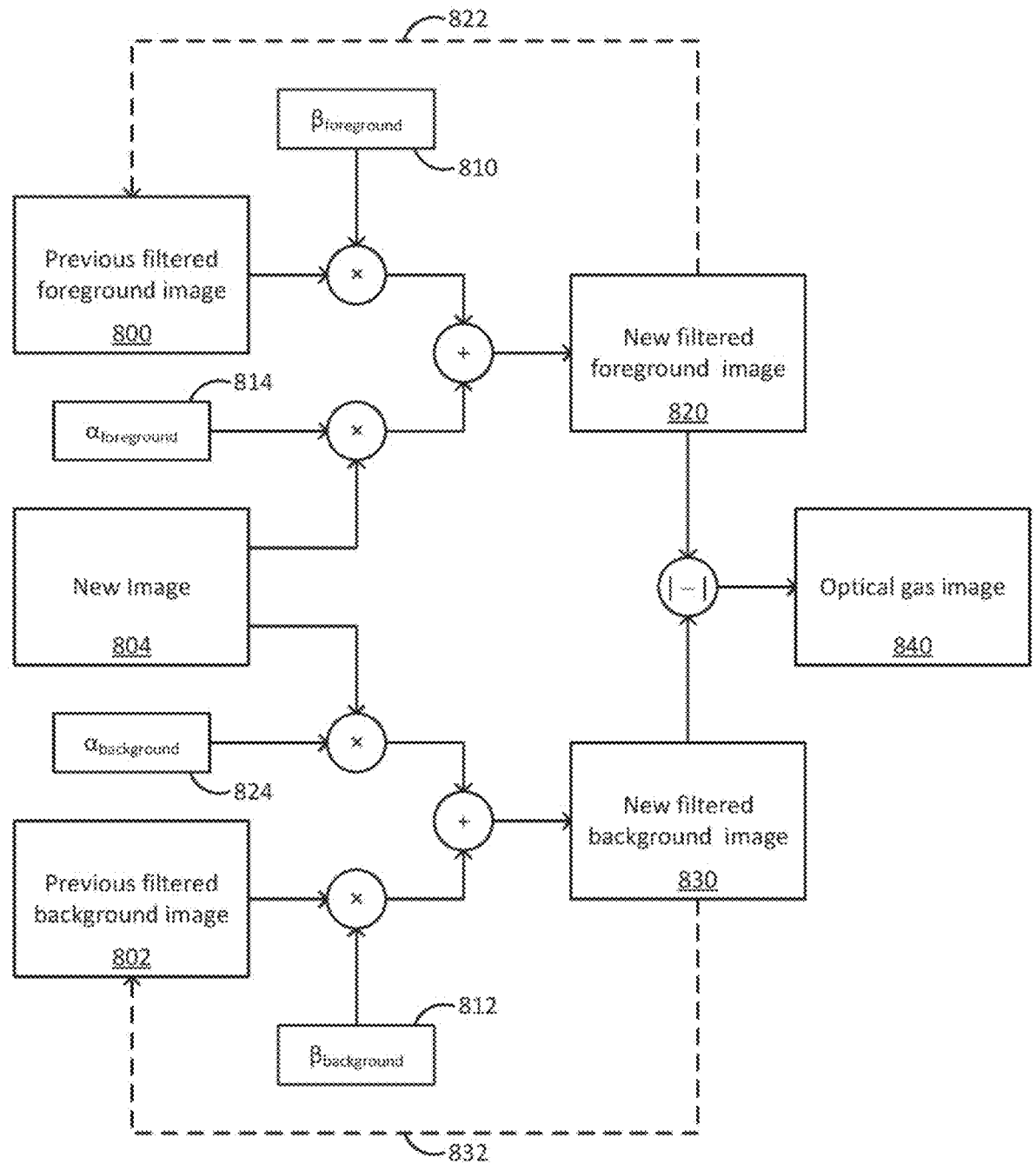
FIG. 8 is a schematic illustration of a process for generating an optical gas image.

FIG. 8 is a schematic illustration of a process for generating an optical gas image using Equations 3 and 4. As shown, a new image 804 is alpha-blended with a previous filtered foreground image 800 using scaling factors $\alpha_{foreground}$ and $\beta_{foreground}$ to create a new filtered foreground image 820. Similarly, the new image 804 is alpha-blended with a previous filtered background image 802 using scaling factors $\alpha_{background}$ and R filtered $\beta_{background}$ to create a new background image 830. The new filtered foreground image 820 and new filtered background image 830 can be compared (shown in FIG. 8 as the absolute value of the difference between the images) to establish an optical gas image 840.

As indicated by arrows 822 and 832, respectively, the new filtered foreground image 820 becomes the previous filtered foreground image 800 and the new filtered background image 830 becomes the previous filtered background image 802 for subsequent iterations of optical gas imaging 840. That is, as described with respect to the repetitive method of FIG. 7, in some embodiments, after generating an optical gas image 840, another new image 804 is captured and blended with the previously used foreground and background images to generate updated foreground and background images, which are then used to generate a new optical gas image.

As described elsewhere herein, the same averaging process should not be used to determine both the foreground image and the background image, since otherwise, subtracting one image from the other would result in a blank frame. Accordingly, with respect to Equations 3 and 4, $\alpha_{foreground} \neq \alpha_{background}$ and $\beta_{foreground} \neq \beta_{background}$. This ensures that the background and foreground images are not necessarily the same. Similarly, when using, for example, higher order IIR filters, having at least one filtering parameter different between the foreground and background filtering techniques results in a difference image that is not constantly zero.

In still further examples, different filters altogether can be used on the foreground image stream and the background image stream to ensure the foreground and background filtering process does not result in a constantly zero difference image. For example, in some embodiments, the filtered background image can be determined using one of a first order IIR filter, a higher order IIR filter, or a FIR filter, while the filtered background image can be determined using different one of the first order IIR filter, higher order IIR filter, or FIR filter.

With further reference to Equations 3 and 4, it is evident that the amount of contribution to a new image from the historical images increases with the β value. That is, a larger β value (and accordingly, a smaller α value) corresponds to an image giving greater weight to the previous image (e.g., 800 or 802 in FIG. 8) than the newly acquired image (e.g., 804). Accordingly, in some embodiments, $\beta_{background} > \beta_{foreground}$ so that the background image is generally weighted more strongly toward historical image data while the foreground image is weighted more strongly toward the current image.

Further, as the process is repeated and the foreground and background images are updated more and more times, the effect of the different blending ratios will compound, establishing a difference in time represented by the foreground and background images.

Another way of interpreting the foreground and background images as they evolve over time is in view of a time constant. Generally, for a given α or β value, the filtered foreground and background images will have contributions from several "new" images that are successively captured over time. However, the number of images that significantly contribute (e.g., a threshold percentage) to the filtered foreground and background images at a given time will be a function of α and β. Further, if the images are captured at a particular frame rate, the number of images that contribute is analogous to a time span during which the images that significantly contribute were captured. That is, for a given α and β blending ratio, there will be an amount of time, τ, before which acquired images no longer significantly contribute to the filtered image. This can be referred to as the time constant associated with the given α and β.

Accordingly, the filtered background image will have a time constant, $\tau_{background}$, such that images captured at a time earlier than $\tau_{background}$ prior to the new captured image will not significantly contribute to the background image. Similarly, the filtered foreground image will have a time constant, $\tau_{foreground}$, such that images captured at a time earlier than $\tau_{foreground}$ prior to the new captured image will not significantly contribute to the foreground image. It will be appreciated that images that do not significantly contribute to the updated images necessarily have no contribution. In some cases, the iteratively updated background and foreground images will include contributions from images captured at more than the time constant earlier than the newly captured image, however, this contribution will be relatively small compared to the overall image (e.g., less than a factor of 1/e, etc.). According to this interpretation, the time constant of the continually updated background image $\tau_{background}$, will be larger than the time constant of the continually updated foreground image, $\tau_{foreground}$ ($\tau_{background} > \tau_{foreground}$). Thus, the background image generally incorporates images taken over a greater period of time than does the foreground image. Additionally, since a longer time constant (larger τ and β) generally incorporates larger contributions of image data from over a longer period of time, a larger time constant generally amounts to more filtering and noise reduction in the filtered image.

In some examples, with respect to Equations 3 and 4, the contribution from a given image will contribute a factor of less than 1/e to the final image after approximately 1/α frames have been added into the filtered image after the given image was added. That is, if α=0.1, then the filtered image will be updated 10 times with newly captured images before a previous image contributes less than a factor of 1/e to the filtered image. If the 1/e threshold is used as determining the time constant, then the time constant can be determined based on the framerate and the value of α according to Equation 5.

$$\tau \approx \frac{1}{\alpha \times framerate} \quad (5)$$

In an exemplary embodiment:
$\beta_{foreground} = 0.9$
$\alpha_{foreground} = 0.1$
$\beta_{background} = 0.99$
$\alpha_{background} = 0.01$
Using Equation 5 and a framerate of 60 Hz,
$\tau_{foreground} \approx 0.17$ seconds
$\tau_{background} \approx 1.67$ seconds Thus, in such an exemplary embodiment, the filtered foreground image is approximately a weighted average of the previous 10 frames captured over the previous 0.17 seconds while the filtered background image is approximately a weighted average of the previous 100 frames captured over the previous 1.67 seconds. The difference between the filtered foreground and filtered background images can be determined to calculate an optical gas image of the scene. It will be appreciated that images captured earlier than one time constant prior to the most recent image will still have minor contribution to the filtered image. The contributions from such images will continue to decrease after more time passes, such as after two, three, or more time constants. For example, the contribution of an image after three time constants is approximately 5%.

In some embodiments, filter parameters such as α, β, τ, or other higher order IIR filter parameters or FIR filter parameters are applied to the entire image. In other examples, such filter parameters can be applied on a region-by-region or pixel-by-pixel basis within an image. For example, in some embodiments, some pixels of a filtered background image are combined with corresponding pixels in a new image based on a first set of filter parameters, while other pixels of the same filtered background image are combined with corresponding pixels in a new image based on a second set of filter parameters different from the first.

The process described with respect to FIGS. 7 and 8 can be repeated, for example, at the image acquisition framerate of a camera (e.g., 30 Hz, 60 Hz, etc.). Each time a new image is captured, it can be blended with previously established foreground and background images to create an updated filtered image with reduced noise and updated content. The new images can be used to generate updated optical gas images at the same rate that images are captured by the camera.

Moreover, in some implementations of such a method, the memory of the camera does not require a buffer of many frames in order to create a filtered foreground image and a filtered background image with reduced noise and sufficiently different to create an optical gas image. In some examples, a camera can include three image streams—a background image stream that is repeatedly updated as new images are captured, a foreground image stream that is repeatedly updated as new images are captured, and an optical gas image stream that is repeatedly updated with the updated foreground and background images. Additionally, only a small amount of processing power is necessary to blend the new image with a previous background image and a previous foreground image to generate new background, foreground, and optical gas images. Thus, in some examples, employing the noise reduction process described in FIGS. 7 and 8 can reduce the demands for processing power, memory, and/or thermal resolution of a thermal imaging camera for performing adequate optical gas imaging processes.

As described elsewhere herein, subtracting foreground and background image data will reveal change in the image (e.g., an evolution of a gas cloud), and will subtract out parts of the image that remain constant. Thus, in some instances, an optical gas image showing gas in an otherwise stationary target scene may exclude important features in the image that are present in both the foreground and background images used to generate the optical gas image and are therefore subtracted out during the generation of the optical gas image. In some such examples, portions of the optical gas image showing an evolving gas cloud will be non-zero, while the rest of the scene, such as any stationary background, equipment, etc. will be approximately zero.

Thus, in some examples, the optical gas image can be combined with one or more additional image data streams in order to generate an image that both shows the presence of gas (e.g., from the optical gas image) and also provides context within the scene, such as from infrared and/or visible light image data. For example, in some embodiments, optical gas image data can be combined with visible light image data in order to illustrate the presence/location of gas in a target scene while retaining the scene context provided by visible light image data. Additionally or alternatively, infrared image data can be included to provide thermal information of the scene. In some examples, optical gas image data can be combined with combinations of infrared and visible light image data, such as described, for example, in U.S. Pat. No. 7,994,480, which is assigned to the assignee of the instant application and is hereby incorporated by reference. In various examples, combinations of optical gas image data and infrared and/or visible light image data can be performed using similar techniques as combinations of infrared and visible light image data, such as using alarm thresholds, picture-in-picture display modes, and the like.

Figure 9:
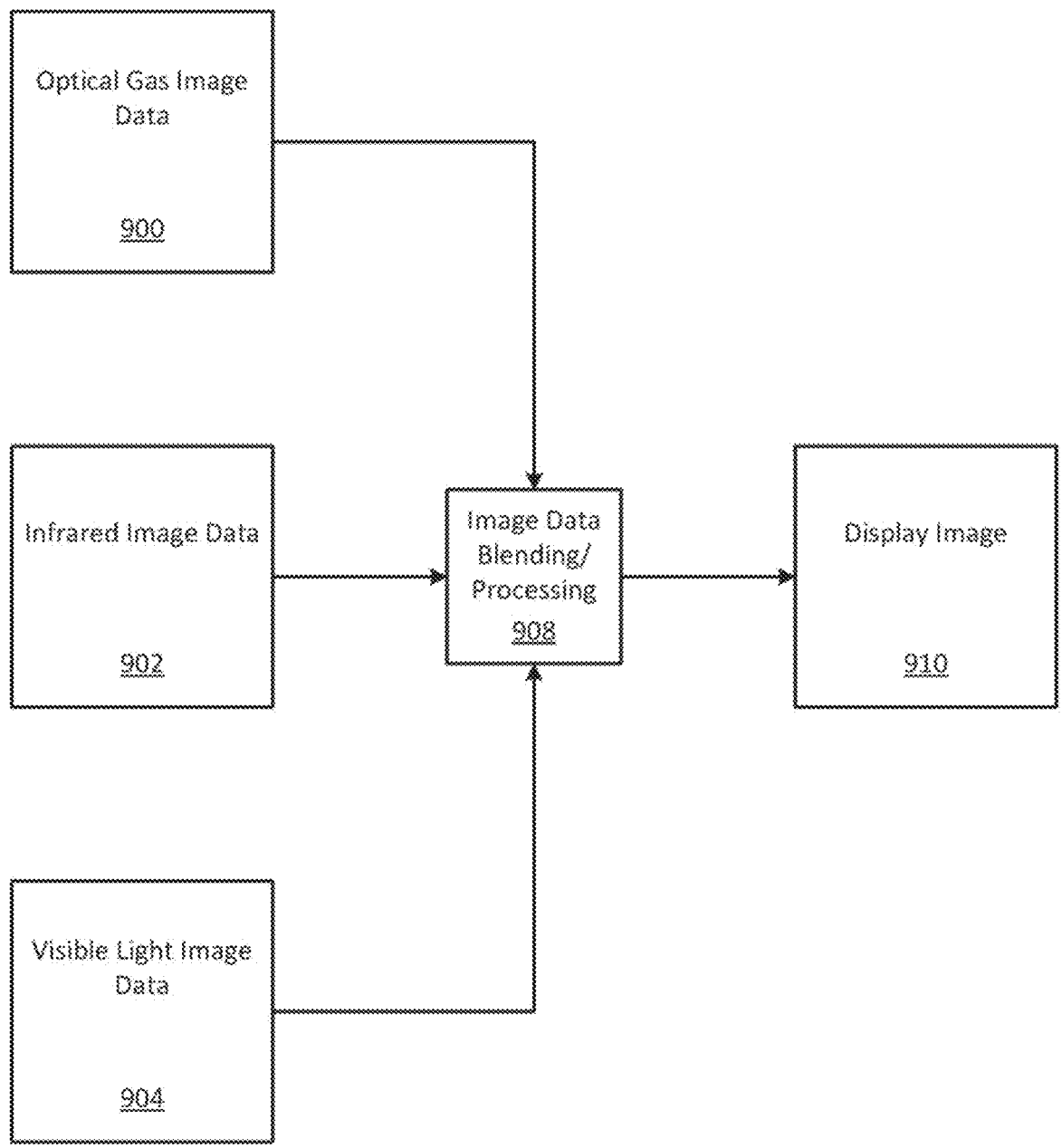
FIG. 9 is a schematic diagram illustrating combinations of image data that can be used to generate a display image.

FIG. 9 is a schematic diagram illustrating combinations of image data that can be used to generate a display image. In the illustrated example, optical gas image data 900, infrared image data 902, and visible light image data 904 are subject to image data blending/processing 908 to generate a display image 910. The image data blending and processing 908 can include a variety of functions, such as combining or overlaying data streams, palettizing/colorizing image data streams, and the like.

In some examples, data streams can be processed all at once, such as via a blend of image data. For example, the display image 910 can include a blend of optical gas image data 900, infrared image data 902, and visible light image data 904 according to Equation 6:

$$\text{Display} = \alpha \times \text{OGI} + \beta \times \text{IR} + \gamma \times \text{VL}; \; \alpha + \beta + \gamma = 1 \quad (6)$$

In other examples, optical gas image data 900 can be blended with and/or overlaid onto infrared image data 902, visible light image data 904, or a combination thereof. For example, as described elsewhere herein, infrared 902 and visible light 904 image data can be blended together, combined in a picture-in-picture format, or otherwise combined in a variety of ways. Such combined infrared image data 902 and visible light image data 904 can be subsequently combined with optical gas image data 900 for generating the display image 910. In some such examples, the optical gas image data 900 can be blended (e.g., alpha-blended) with the combined infrared 902 and visible light 904 image data. In other examples, the optical gas image data 900 can be overlaid on top of the combined infrared 902 and visible light 904 image data.

In some embodiments, the optical gas image data 900 is palettized according to a palettization scheme prior to combining the optical gas image data 900 with other image data streams such that the gas image data 900 is more easily visible in the display image 910. For example, in some embodiments, the optical gas image data 900 is palettized according to a palettization scheme that contrasts with the palettization scheme in which the infrared image data 902 is displayed so that the optical gas image data 900 can be readily seen. In other examples, β in Equation 6 is set to zero, so that the optical gas image data is combined with the visible light image data. In some such examples, the optical gas image data can be palettized to contrast with the visible light image data. Additionally or alternatively, the optical gas image data 900 can be combined with some or all of the visible light image data, such as via a picture-in-picture mode. In various examples, the optical gas image data can be overlaid onto the visible light image data and/or blended with the visible light image data.

Additionally or alternatively, other image processing techniques on one or more image data streams can be performed. For example, edge enhancement techniques can be employed in order to emphasize the edges of objects and/or a gas cloud in the image data, such as described in U.S. patent application Ser. No. 14/837,757 or 14/222,153, each of which is assigned to the assignee of the instant application and is hereby incorporated by reference. Other image processing techniques can include determining and displaying information regarding the likelihood of observing a gas cloud in a target scene using certain gas detection techniques, such as described in U.S. Pat. No. 9,464,984, which is assigned to the assignee of the instant application and is hereby incorporated by reference.

In some examples, a thermal imaging camera can show a real-time optical gas image on a display so that a user may observe the evolution of the gas in the scene over time. For example, in some embodiments, the process of FIG. 7 is performed every time a new image is captured, and each new optical gas image is presented to the user on the display, for example, as a real-time optical gas video. Such display can be presented as optical gas image data (e.g., 900) alone or as a processed display image (e.g., 910), for example, including visible light and/or infrared image data. In other examples, the thermal imaging camera can present a traditional image on the display, such as an infrared image, a visible light image, or a combination of visible light and infrared image data, while performing optical gas imaging analysis in the background. In some such embodiments, the thermal imaging camera can be used to acquire an optical gas image (or a display image including optical gas image data) even when the real-time display does not necessarily include optical gas image data.

In various embodiments, a user may select, for example, via a user interface, whether the real-time display and/or any captured image and/or video data includes optical gas image data. In some examples, capturing image data using a thermal imaging camera comprises capturing infrared image data 902, visible light image data 904, and calculated optical gas image data 900 substantially simultaneously. Such image data can be presented in real-time on a display according to a particular blending/processing scheme (e.g., in 908), and/or can be combined after the fact in any way desired by the user for display, for example, on the camera itself or a stand-alone work station. In various embodiments, blending/processing techniques employed for real-time display of the display image 910 can be adjustable by a user. In some examples, the available blending/processing techniques are selectable from a series of pre-defined image combination techniques and/or can be fully customizable by a camera operator.

Since optical gas imaging typically leverages the ability of the gas to absorb in the infrared spectrum to image otherwise transparent gas, optical gas image data is often generated using infrared image data (e.g., 902). Thus, in some embodiments, visible light image data 904 is not necessarily captured in conjunction with the infrared image data 902 and the generating of optical gas image data 900. In exemplary embodiment, optical gas image data 900 is generated according to the process shown in FIG. 8. For each iteration of the process of FIG. 8, when a new image 804 is captured in order to generate an optical gas image 840, the new image 804 comprises infrared image data 902 while the corresponding optical gas image 840 comprises the optical gas image data 900 corresponding to the infrared image data 902. In some such embodiments, visible light image data 904 can be captured along with the infrared image data 902. Put another way, in some examples, infrared image data 902 and optionally visible light image data 904, are captured at a framerate (e.g., 60 Hz.). The captured infrared image data 902 is used as the new image 804 in the process of FIG. 8 for generating an optical gas image 840 including optical gas image data 900. It will be appreciated that, if visible light image data 904 is used to generate optical gas image data 900, infrared image data 902 can be excluded and a similar process can be performed using visible light image data 904.

During an exemplary gas imaging process, if the thermal imaging camera is sufficiently stationary (e.g., on a tripod), long time constants $\tau_{background}$ and $\tau_{foreground}$ can be used to increase the amount of filtering and reduce the amount of noise in the filtered foreground and background images. However, as noted elsewhere herein, the time constants $\tau_{back}$ and $\tau_{foreground}$ should be sufficiently different from one another that the difference between the filtered foreground and background images is not approximately zero.

Additionally, in some cases, the time constants should not be so long that certain artifacts effectively obscure thermal image data. For example, in some cases, a thermal imaging camera, such as a thermal imaging camera comprising an uncooled sensor assembly, will be subject to internal heating, which can cause the thermal image data to drift over time. In some examples, different image processing techniques are used to reduce such thermal artifacts that appear in the image data. However, if an image filtering time constant is too long (e.g., includes significant contribution from images from a sufficiently long time prior), a combination of scenes with and without, or with different degrees of, thermal drift can make it difficult to compensate for the drift. Accordingly, in some examples, while somewhat long time constants are generally advantageous, time constants can be limited to a maximum value in order to reduce any possible artifacts introduced, for example, by self-heating of the camera.

Additionally or alternatively, other events can lead to inaccuracies in the filtered images that include contributions from image data captured over a time period. For example, if the target scene being imaged by a thermal imaging camera changes (e.g., do to camera motion), images representing the previous target scene may still contribute to the filtered images. For instance, if generating filtered background and foreground images that include contributions from image data captured prior to the camera motion, the blending of image data from different scenes will obscure the resulting image. Moreover, comparing such images, for example, the result of subtracting a filtered background image from a filtered foreground image as described elsewhere herein when at least one of the images includes contributions from multiple target scenes will likely be obscured to the point that gas could not be reasonably detected in the difference image. That is, the images would be generally unsuitable for generating an optical gas image until the previous background scene was effectively decayed from the image.

Similarly, if a user is holding the camera in his or her hand, the image is likely to be less steady when compared to an image captured by a camera fixed on a tripod. Thus, a long time constant that effectively averages many images into a filtered image is more likely to include images taken from several slightly different perspectives as the camera shakes in the user's hand. This can also lead to artifacts, clutter, and general inaccuracy in the filtered image(s), and can obscure gas in an optical gas image.

Thus, there is a tradeoff between using a enough filtering (e.g., large enough sample of frames, a sufficiently large time constant, etc.) to reduce the noise in the filtered foreground and background images as much as possible, and not using so much filtering to risk imparting artifacts or inaccuracies into a filtered image (e.g., due to camera motion, self-heating, etc.). Moreover, the optimal amount of filtering can depend on a variety of parameters, such as whether the camera is mounted or hand-held, or if the camera moves to image a different target scene.

The amount of time required for the previous background scene to effectively decay from the foreground and/or background image depends on the filtering technique employed to generate the filtered foreground and background images. For example, with respect to FIG. 6, if frames 1-5 (the frames taken at the earliest time) are averaged to generate the filtered background image from a two second buffer, the background image will include contributions from a scene for up to two seconds after the scene changes. That is, if the camera pointing is changed so that the camera changes from imaging a first target scene to a second target scene, the filtered background image will include contributions from the first target scene for up to two seconds after the camera pointing is changed. Not only will the camera be less capable of performing optical gas imaging for these two seconds, but the generated image will likely be cluttered and difficult to comprehend, since it could be based on image data from two different scenes (e.g., the difference between the first target scene and the second target scene).

Similarly, if, for example, Equations 3 and 4 are used to calculate the filtered foreground and background images, respectively, the amount of time after which image data from the first target scene will effectively be decayed from the filtered image is a function of the time constants of the filtering process. As described, generally $\tau_{background} > \tau_{foreground}$, and if $\tau_{background}$ is approximately the time it takes for an image to decay to contribute a factor of $1/e$ into the filtered background image, it will take approximately three time constants ($3 \times \tau_{background}$) after changing from the first target scene to the second target scene for the contribution from the previous scene to fall to 5%. In the example described above wherein $\beta_{background}=0.99$, this would amount to approximately 1.67×3=5 seconds before the previous scene would decay to a 5% contribution. In some cases, this can become frustrating to the user, since the camera would generally be unable to provide an observable scene or a reliable optical gas image for approximately 5 seconds after the camera is moved.

FIG. 10 is an exemplary user interface showing user-selectable options for performing gas imaging operations. In the embodiment of FIG. 10, a user may select to enable or disable gas detection mode using ON and OFF buttons. When gas detection mode is off, the thermal imaging camera will not show optical gas image data on the display, for example, when presenting a substantially real-time display of acquired image data. In some examples, when optical gas imaging is turned off, the thermal imaging camera calculates but does not display optical gas image data. In other examples, when the optical gas imaging is turned off, the thermal imaging camera does not calculate optical gas image data.

The interface of FIG. 10 further includes selectable Image Capture or Video Capture modes of operation. The user can select whether saving optical gas image data is accomplished as standalone optical gas images or as a video stream of optical gas images (the optical gas images or video being optionally combined with infrared and/or visible light image data).

As described elsewhere herein, motion of the camera during an optical gas imaging process can negatively impact the quality of the image. For example, camera motion can lead to slight changes of the imaged scene over the course of acquiring images that contribute to filtered foreground or background image, which can lead to artifacts present in the image data. In the embodiment of FIG. 10, the user is able to select between a tripod mode of operation and a handheld mode of operation. In some examples, each of the tripod mode and handheld mode of operation are associated with predetermined optical gas imaging filtering parameters that affect the amount of contribution of previously captured images. Such predefined filtering parameters can include, for example, the number of frames in buffer 600 that are averaged (e.g., according to Equations 1 and 2) or the time constants $\tau_{foreground}$ and $\tau_{background}$ associated with Equations 3-5 to generate the filtered foreground or background images.

Because a thermal imaging camera supported by a tripod will generally experience less inadvertent motion, the time constants and/or number of frames used for generating the filtered foreground and background images can be longer in order to further reduce noise in the image without as many artifacts introduced into the scene due to camera motion. Thus, in some examples, the number of frames from buffer 600 averaged to generate the filtered background image is greater in the tripod mode of operation than in the handheld mode. In other examples, the background and/or foreground time constant ($\tau_{background}$ and/or $\tau_{foreground}$) associated with the tripod mode is longer than the background time constant associated with the handheld mode of operation. Analogously, the filtering parameter $\beta_{background\_tripod} > \beta_{background\_handheld}$.

Since the foreground time constant is generally shorter than the background time constant, it is generally less prone to developing artifacts over time. Accordingly, in some examples, the foreground time constant ($\tau_{foreground}$) may be the same for both tripod and handheld modes of operation. In other examples, similar to the background time constant, the foreground time constant is longer in tripod mode than in handheld mode. Similarly, in other examples, the number of images averaged from butter 600 to generate the filtered foreground image in tripod mode can be greater than or equal to the number used in handheld mode.

According to the exemplary user interface of FIG. 10, a user may select a mode of operation based on the intended use of the thermal imaging camera. The user may disable gas detection mode when using the thermal imaging camera in a traditional thermal imaging mode, and may enable gas detection mode in order to perform an optical gas imaging process. In some examples, the user may elect to operate in image or video modes of gas detection. Further, the user can select whether to operate the thermal imaging camera in tripod or handheld mode, which can dictate which of a predefined set of filtering parameters are used when generating the optical gas image.

In an exemplary embodiment, the tripod mode of operation includes blending parameters of $\beta_{background}$=0.99 ($\alpha_{background}$=0.01, $\tau_{background}$≈1.67 seconds) and the handheld mode of operation includes blending parameters of $\beta_{background}$=0.99 ($\alpha_{background}$=0.01, $\tau_{background}$≈1.67 seconds). In another example, tripod mode of operation includes blending parameters of $\beta_{background}$=0.96875 (31/32) and $\beta_{foreground}$=0.9375 (15/16) and the handheld mode of operation includes blending parameters of $\beta_{background}$=0.875 (7/8) and $\beta_{foreground}$=0.75 (3/4).

In some examples, the optical gas detection interface further includes a "custom" option in which a user can customize setting used for performing optical gas imaging. For instance, in some such embodiments, the thermal imaging camera can be configured to perform image filtering during an optical gas imaging process using one or more adjustable filter parameters. Such adjustable filter parameters can include the number of frames averaged from buffer 600 to generate the filtered background and/or foreground images or the blending ratios, α and β, and similarly the time constant, τ, of Equations 3-5. Other filtering parameters, for example, relating to higher order IIR filters or the like, can similarly be adjusted by the user. Additionally or alternatively, a user may be able to select a type of filter used to generate the filtered background and/or foreground images, such as selecting between any one or more of a FIR filter, a first order IIR filter, and a higher order IIR filter. Other user-adjustable parameters can include blending and/or processing parameters (e.g., 908) for generating a display image 910 from the optical gas image data 900 and other image data streams.

As described, the camera can be programmed with predefined filtering parameters that can be used when operating in particular modes of operation in which camera motion is more or less likely (e.g., handheld operation vs. tripod operation). However, even within such modes of operation, the camera may move a significant amount, such as panning from one scene to another or as a user moves to a new imaging location. This motion can similarly cause the target scene to change, resulting in possible contributions to a filtered image from different scenes and resulting in a filtered image that is cluttered and inaccurate with respect to the current target scene for the camera.

As described elsewhere herein, adjusting the filtering parameters (e.g., a number of frames averaged from a buffer 600, parameters α, β, τ from Equations 3-5, etc.) can affect the impact of motion in the target scene by reducing the contribution from frames from an earlier time. For example, with respect to FIG. 6, averaging frames 60-120 at a framerate of 60 Hz will only average images going back one second, rather than averaging, for example frames 1-120, which will average images going back two seconds. Thus, image contribution from a previous target scene will impact the filtered image for less time when filtering over the more recent portion of the buffer.

Similarly, with respect to the filtering described with respect to Equations 3-5, a time constant of approximately 1.67 seconds (β=0.99, α=0.01) will result in a filtered image having contributions of images of approximately 5% or more over approximately the previous 5 seconds. By contrast, a time constant of approximately 0.17 seconds (β=0.9, α=0.1) will result in a filtered image having contributions of images of approximately 5% or more over approximately the previous 0.5 seconds. Thus, reducing β (or analogously, increasing α or decreasing τ) reduces the contributions of images from images going back further in time.

In some embodiments, a thermal imaging camera can be configured to detect motion of the camera. For example, the thermal imaging camera can include one or more accelerometers or other motion sensors (e.g., MEMs, gyros, etc.) configured to sense motion of the camera. Such sensors can provide data to the processor, which can use the data to determine that the camera has moved or is moving. Additionally or alternatively, the camera can be configured to analyze captured frames to determine inter-scene motion, such as using image registration processing to determine an amount the camera has moved from frame to frame. In some embodiments, the thermal imaging camera can use detected motion data to determine if the camera has moved a sufficient amount to impact the efficacy of the current filtering parameters for generating a high quality optical gas image without clutter or artifacts from a previous target scene.

Figure 11:
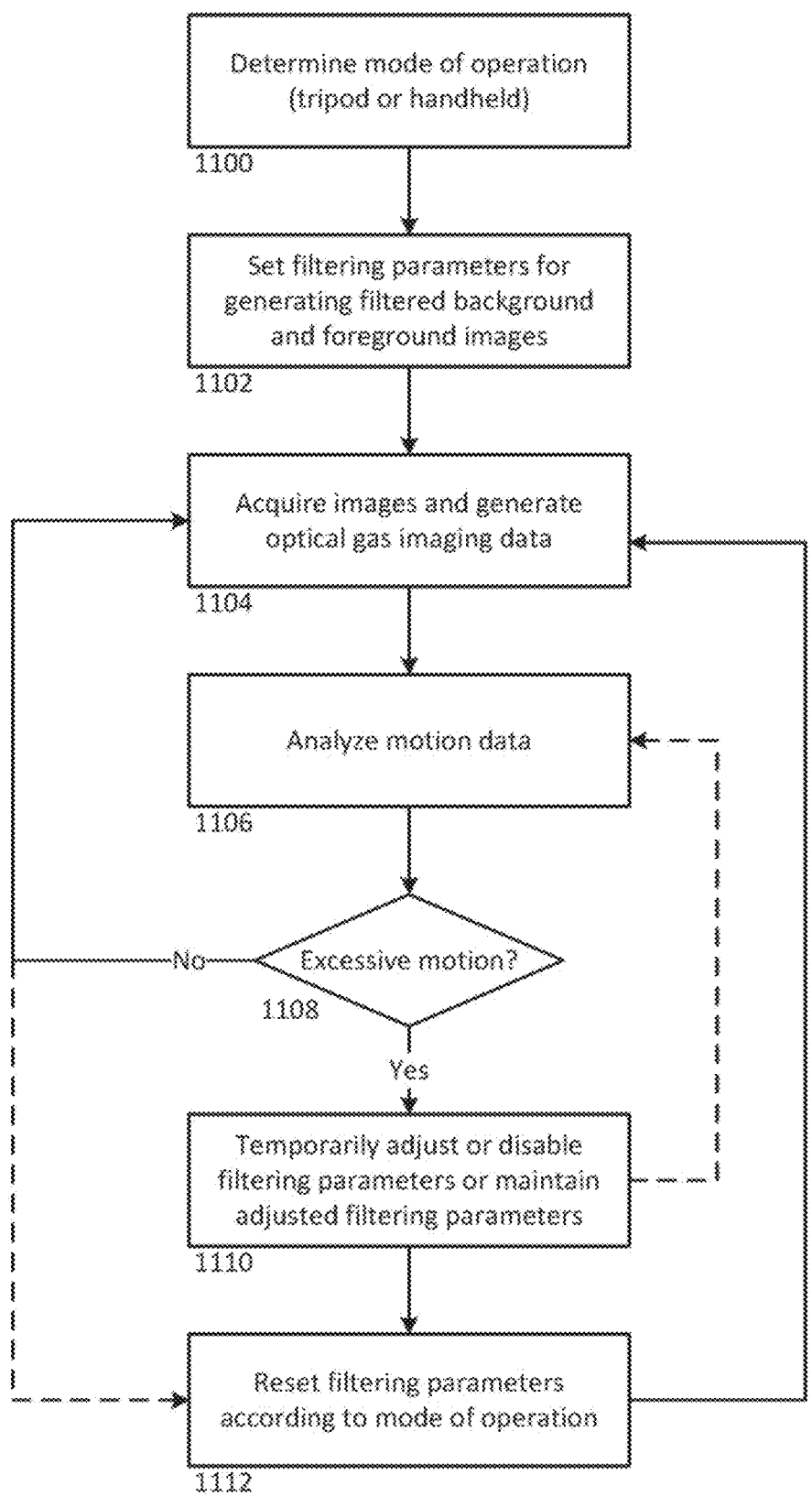
FIG. 11 is a process flow diagram illustrating a process for accommodating for camera motion during an optical gas imaging process.

FIG. 11 is a process flow diagram illustrating a process for accommodating for camera motion during an optical gas imaging process. The method includes determining the current mode of operation of the camera (1100), such as, for example, a tripod mode or a handheld mode, and setting filtering parameters for generating filtered background and foreground images (1102). As described elsewhere herein, such filtering parameters can be predefined parameters based on the current operating state of the thermal imaging camera.

The method includes the step of acquiring images and generating optical gas imaging data (1104). This can include, for example, performing any of the processes described herein, such as using one or more of Equations 1-5 or FIGS. 7-9. The thermal imaging camera can continue acquiring images (e.g., new image 804 in FIG. 8) and generating optical gas image data (e.g., optical gas image 840), for example, at the image acquisition frame rate of the thermal imaging camera.

While performing the optical gas imaging process, the camera can analyze motion data of the camera (1106). Motion data can be provided by any of a variety of sources, for example, one or more hardware components (e.g., accelerometers, etc.), image analysis (e.g., registration processing) or the like. The camera can determine if excess motion is present (1108). In some embodiments, the camera compares an amount of motion (e.g., an amount of rotation, an amount of linear motion within the image data in consecutive scenes based on registration analysis, etc.) to a first threshold. If no excessive motion of the camera is detected, the camera proceeds to acquire images and generate optical gas imaging data (1104) according to typical operation.

However, if excess motion is detected, the camera can temporarily adjust or disable the filtering parameters used in the optical gas imaging process (1110). For example, if performing an first order IIR filtering process according to Equations 3-5, upon sensing excessive motion in step 1108, the camera can reduce the value of $\beta$ (particularly $\beta_{background}$) in order to reduce or eliminate the contribution of frames acquired prior to the detected excessive motion to the filtered images. Doing so can help eliminate clutter or artifacts in the image that may confuse or annoy the user.

In some examples, temporarily reducing the filtering parameters comprises reducing the background and/or foreground filtering parameter $\beta$ to a predetermined value. In some such examples, the predetermined value is zero so that the optical gas image only comprises the most recently acquired image and does not include historical data from before the camera motion took place.

In some examples, such reduction in the filtering parameters occurs for a predetermined period of time, such as for one second, half of a second, or the like. In some such embodiments, after the expiration of such period of time, the filtering parameters are reset according to the normal mode of operation (1112) such as established in step 1100 and optical gas imaging continues at step 1104.

In other examples, after adjusting the filtering parameters (1110), the camera can continue to analyze motion data (1106) as represented by the broken line between 1110 and 1106, and determine if excess motion is still present (1108). If so, the camera maintains the reduced filtering parameters and continues to analyze the motion until the detected motion (e.g., between consecutive frames) reduces below a second threshold. In some such examples, the second threshold can be equal to the first threshold, or can be different from the first threshold. If excessive motion is no longer detected at 1108, then filtering parameters are reset according to the mode of operation (1112) before optical gas imaging is resumed.

In some examples, scene changes that contribute to clutter or confusion in a filtered image (e.g., a filtered background image) are due to changes other than camera motion. Thermal changes in the target scene effectively change the image data captured across a plurality of frames, which can lead to similar errors brought about by camera motion as described elsewhere herein. For example, if a person unexpectedly walks through the target scene, residual thermal artifacts from the person may remain in the filtered images even after the person departs the target scene. In an exemplary embodiment, if a person moves into the target scene, thermal image data representing the person will generally build up in the filtered background image over the course of a few time constants. However, since the foreground time constant is typically shorter than the background time constant, thermal image data representing the person will build up in the filtered foreground image quicker than in the background image. Thus, when comparing the filtered background and foreground images to generate optical gas image data, the differences between the thermal signature of the person in the background and foreground images will make the moving person appear in the optical gas image.

The same principle will apply with any substantive thermal change in the target scene. Similar to motion of the camera, changing of the thermal characteristics of the target scene will tend to cause cluttering of the image due to residual artifacts of the previous scene prior to the changes of the thermal data. As with the motion described elsewhere herein, such residual artifacts will typically last for several time constants until eventually being decayed from the filtered image data.

Figure 12:
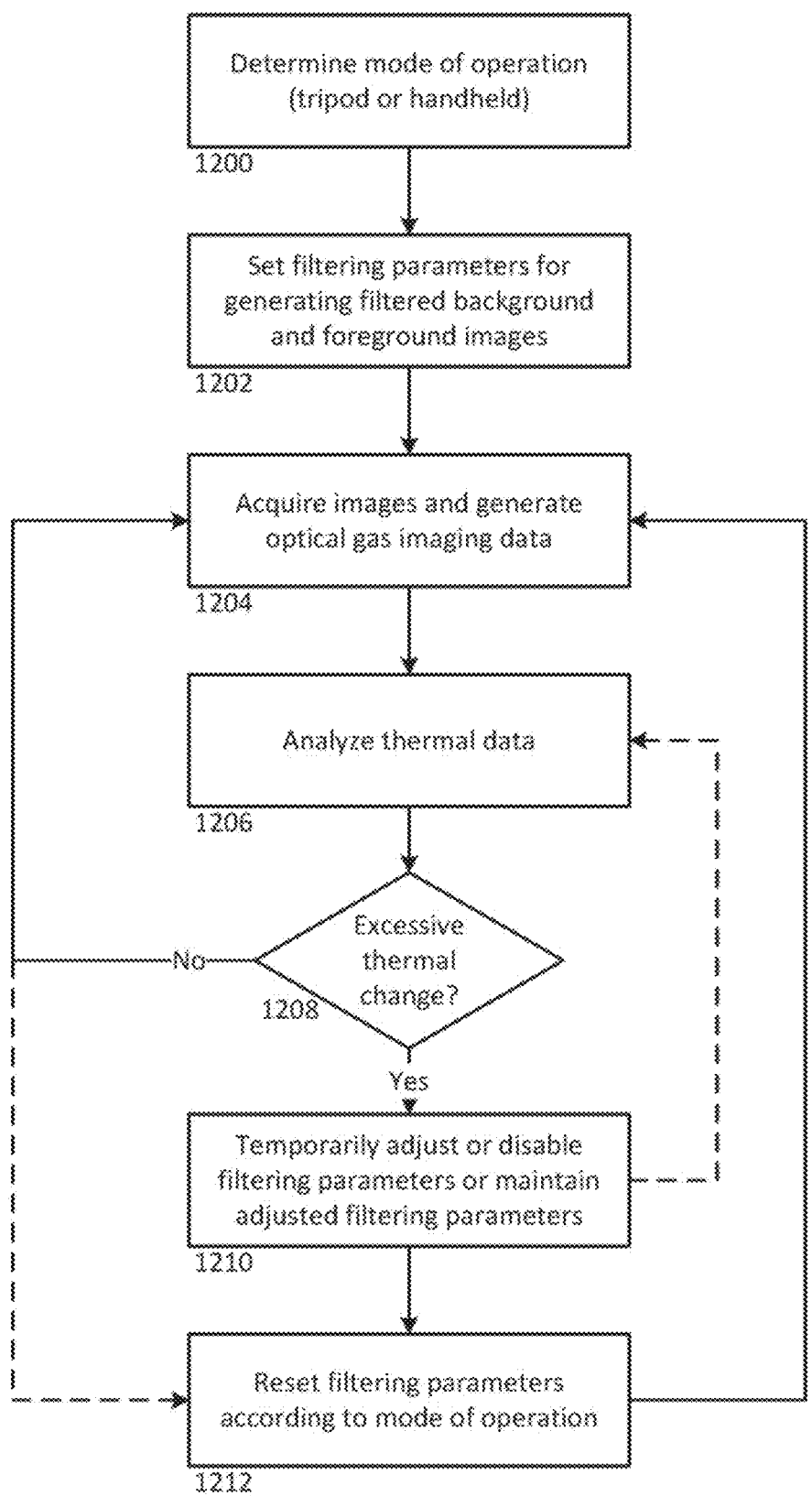
FIG. 12 is a process flow diagram illustrating a process for accommodating for thermal change during an optical gas imaging process.

Artifacts in the filtered images due to thermal changes in the target scene can be addressed in a similar manner to addressing artifacts due to scene motion (e.g., camera motion/jitter). FIG. 12 is a process flow diagram illustrating a process for accommodating for thermal change during an optical gas imaging process. The method of FIG. 12 is similar to that shown in FIG. 11. The method similarly includes determining the current mode of operation of the camera (1200) and setting filtering parameters for generating filtered background and foreground images (1202). The method includes the step of acquiring images and generating optical gas imaging data (1204).

According to the method of FIG. 12, while performing the optical gas imaging process, the camera can analyze thermal data of the target scene being imaged by the camera (1206). Thermal changes can be caused by any variety of sources, such as an object entering or leaving the scene, or an event occurring in the scene causing a significant thermal change. The camera can determine if excess thermal changes are present (1208), for example, by comparing detected changes to a threshold value. Threshold values can include, for example, an absolute temperature change exceeding a threshold or a rate of change of temperature exceeding a threshold. In an exemplary embodiment, the camera compares the rate of change of temperatures (e.g., frame-to-frame changes) in the target scene to a first threshold. If no excessive thermal changes are detected, the camera proceeds to acquire images and generate optical gas imaging data (1204) according to typical operation.

However, if excess thermal changes are detected, the camera can temporarily adjust or disable the filtering parameters used in the optical gas imaging process (1210). For example, if performing a first order IIR filtering process according to Equations 3-5, upon sensing excessive thermal changes in step 1208, the camera can reduce the value of β (particularly $β_{background}$) in order to reduce or eliminate the contribution frames acquired prior to the detected excessive thermal change to the filtered images. Doing so can help eliminate clutter or artifacts in the image that may confuse or annoy the user.

As described elsewhere herein, in some examples, filter parameters (e.g., a, (3, etc.) can vary within an image during an exemplary filtering process. For example, in a first order IIR filtering process, some pixels or groups of pixels may be updated with a different time constant than other pixels or groups of pixels. With respect to FIGS. 11 and 12, certain changes in the detected image data can be localized to certain regions within the image. For example, with respect to FIG. 12, in some environments, excessive thermal change (1208) might occur due to a localized hot spot appearing in an image (e.g., a person entering a portion of the scene) without affecting other portions of the scene. In some examples, the pixels or regions affected by the thermal change (e.g., the pixels including the person entering the scene) can be identified and distinguished from those unaffected by the change. In some such examples, temporarily adjusting or disabling filtering parameters (1210) can be performed only on the pixels or regions in which the excessive thermal change (1208) is detected. In an exemplary embodiment, such thermal changes can be detected by analysis of consecutive or nearly consecutive unfiltered (e.g., new) infrared images. Comparisons of such images can be used to determine the presence and location of excessive temperature changes that may negatively impact optical gas imaging.

Similarly, with respect to FIG. 11, as described elsewhere herein, certain video compression standards (e.g., MPEG) can be analyzed to detect motion within a scene (e.g., via motion vector analysis). In some embodiments, motion of the entire scene (e.g., due to camera motion) can be detected using such video analysis. However, in other examples, such analysis can be used to determine the portions of the image experiencing scene-to-scene motion (e.g., those affected by movement within the scene). Similarly, in some such examples, filtering parameters associated with individual regions or pixels that experience excessive motion (1108) can be temporarily adjusted or disabled (1110) while the filtering parameters of other regions (e.g., not experiencing excessive motion) can remain unaffected. In some embodiments, image processing to determine excessive motion can be performed on infrared image data.

Additionally or alternatively, such image processing can be performed on corresponding visible light image data. In some examples, visible light image data provides a clearer image in which such motion analysis can be performed more easily than in infrared image data.

In still further embodiments, the amount filtering parameters are adjusted due to detected scene changes (e.g., in-scene motion or isolated temperature changes) can be dependent on the amount of scene change detected as such locations. For example, in some embodiments, the amount that filtering parameter of regions or pixels that experience excessive thermal change (1208) are adjusted by an amount dependent upon the amount of detected thermal change.

Image filtering and optical gas imaging techniques described herein can be used to reduce the noise of thermal images so that changes between scenes due to the presence of an infrared absorbing gas in the target scene can be resolved from the noise. Similarly, the adaptability of the filtering techniques can accommodate use in both hand-held and tripod-mounted cameras, maximizing the noise reduction without inducing false residual artifacts into the image data.

The filtering and corresponding optical gas imaging techniques can be used, for example, in a thermal imaging camera including an uncooled sensing array and without the need for expensive optical notch and/or bandpass filters, greatly reducing the cost and complexity of portable systems used for performing such processes. Similarly, such uncooled cameras can themselves be smaller, lighter, and easier to transport from location to location than more complex, cooled thermal imaging cameras, increasing the ease and capability of performing high quality optical gas imaging processes in a plurality of locations using a single camera.

Processes described herein, such as generating filtered background and foreground images and optical gas image data, can be performed using one or more processors, such as processor 222 embedded in a thermal imaging camera that is configured to capture images that are filtered. In some embodiments, processors configured to perform some or all of such processes can be located separately from the thermal imaging camera(s) that acquire the image data.

For example, in some embodiments, a thermal imaging camera can be fixedly positioned in place for continued thermal analysis of equipment under test. The thermal imaging camera can be configured to acquire thermal image data of a target scene and communicate the thermal image data to an external device for subsequent processing, such as a workstation, the cloud, a technician's mobile device (e.g., smartphone, tablet, etc.) or the like. In some such examples, various processing steps can be taken at the external device, such as via software operating on the workstation, an application ("app") running on the technician's mobile device, cloud computing, or the like.

In some examples, substantially real-time optical gas imaging processes can be performed by processing the captured images at the external device. In such examples, the thermal imaging camera used to acquire the image data can be inexpensive and include minimal processing power, but can capture images used for optical gas imaging analysis. Additionally or alternatively, in some examples, processing steps in various processes described herein can be divided among a variety of components, such as a thermal imaging camera that captures thermal images, an external device, or the like.

Various embodiments have been described. Such examples are non-limiting, and do not define or limit the scope of the invention in any way. Rather, these and other examples are within the scope of the following exemplary embodiments.

The invention claimed is:

1. A real-time optical gas imaging system comprising:
   an infrared camera module configured to capture infrared radiation and generate infrared images of a target scene comprising infrared image data;
   a memory for storing one or more infrared images;
   a display;
   one or more processors configured to:
   create a filtered background image by combining infrared image data from a first plurality of infrared images captured over time by the infrared camera module using a first filtering process, the first filtering process including a first filtering parameter;

create a filtered foreground image by combining infrared image data from a second plurality of infrared images captured over time by the infrared camera module using a second filtering process, the second filtering process including a second filtering parameter;

create optical gas image data by comparing the filtered background image and the filtered foreground image;

detect a change in the received infrared image data that is indicative of a non-zero amount of change in the captured infrared radiation of the target scene; wherein if the detected change exceeds a threshold:
temporarily adjust the first filtering parameter of the first filtering process to a third filtering parameter in response to the detected change for a first amount of time to reduce the influence of infrared images from the first plurality of infrared images captured at a time prior to the detected change; and/or temporarily adjust the second filtering parameter of the second filtering process to a fourth filtering parameter in response to the detected change for a second amount of time to reduce the influence of infrared images from the first plurality of infrared images captured at a time prior to the detected change;

if the detected change does not exceed the threshold, then:
do not cause the temporary adjustment of the first filtering parameter of the first filtering process to the third filtering parameter for the first amount of time based on the detected change having not exceeded the threshold; and do not cause the temporary adjustment of the second filtering parameter of the second filtering process to the fourth filtering parameter for the second amount of time based on the detected change having not exceeded the threshold; and generate a display image including the optical gas image data for presentation on the display.

2. The system of claim 1, wherein detecting a change in the received infrared image data comprises detecting motion of the infrared camera module.

3. The system of claim 2, further comprising one or more motion sensors configured to generate motion data based on movement of the infrared camera module; and wherein detection motion of the infrared camera module comprises receiving motion data from the one or more motion sensors.

4. The system of claim 3, wherein the one or more motion sensors comprises at least one accelerometer.

5. The system of claim 1, wherein the infrared image data comprises a plurality of regions, each region including one or more pixels, and wherein each of the plurality of regions includes a corresponding first and second filtering parameter, and wherein detecting change in the received infrared image data comprises detecting regions in the infrared image data in which the change occurred, and adjusting the first filtering parameter and/or the second filtering parameter in such regions but not in regions in which the change did not occur.

6. The system of claim 1, further comprising a user interface by which a user can select between a plurality of modes of operation, and wherein changing modes of operating changes at least one of the first filtering parameter and the second filtering parameter.

7. The system of claim 6, wherein the selectable modes of operation include a handheld mode and a tripod mode.

8. The system of claim 1, further comprising a visible light camera module configured to generate visible light image data representative of the target scene, and wherein the display image includes a blend of optical gas image data and at least one of infrared image data and the visible light image data.

9. The system of claim 1, wherein the system is housed in a camera housing forming a thermal imaging camera.

10. A non-transitory computer-readable medium comprising instructions for causing one or more programmable processors to perform a method of real-time optical gas imaging of a target scene, the method comprising:

creating a filtered background image by combining infrared image data from a first plurality of infrared images captured over time by an infrared camera module using a first filtering process, the first filtering process including a first filtering parameter;

creating a filtered foreground image by combining infrared image data from a second plurality of infrared images captured over time by the infrared camera module using a second filtering process, the second filtering process including a second filtering parameter;

creating optical gas image data by comparing the filtered background image and the filtered foreground image;

detect a change in the received infrared image data that is indicative of a non-zero amount of change in the captured infrared radiation of the target scene; wherein when the detected change exceeds a threshold:
temporarily adjust the first filtering parameter of the first filtering process to a third filtering parameter in response to the detected change for a first amount of time to reduce the influence of infrared images from the first plurality of infrared images captured at a time prior to the detected change; and/or temporarily adjust the second filtering parameter of the second filtering process to a fourth filtering parameter in response to the detected change for a second amount of time to reduce the influence of infrared images from the second plurality of infrared images captured at a time prior to the detected change;

when the detected change does not exceed the threshold, then:
do not cause the temporary adjustment of the first filtering parameter of the first filtering process to the third filtering parameter for the first amount of time based on the detected change having not exceeded the threshold; and do not cause the temporary adjustment of the second filtering parameter of the second filtering process to the fourth filtering parameter for the second amount of time based on the detected change having not exceeded the threshold; and generating a display image.

11. The method of claim 10, wherein:
creating the filtered background image comprises calculating an average of the first plurality of infrared images from a buffer;

creating the filtered foreground image comprises calculating an average of the second plurality of infrared images from the buffer; and the first plurality of infrared images is different from the second plurality of infrared images.

12. The method of claim 11, wherein:

the first plurality of infrared images in the buffer comprises images captured within a first time interval within a time period;

the second plurality of infrared images in the buffer comprises images captured within a second time interval within the time period; and the first time interval and the second time interval do not overlap.

13. The method of claim 10, wherein:

the first filtering process comprises capturing the first plurality of infrared images over time and applying a first infinite impulse response (IIR) filter to the captured infrared images such that creating the filtered background image comprises iteratively updating the filtered background image by blending a previous filtered background image with a new infrared image, and the second filtering process comprises capturing the second plurality of infrared images over time and applying a second IIR filter to the captured infrared images such that creating the filtered foreground image comprises iteratively updating the filtered foreground image by blending a previous filtered foreground image with a new infrared image.

14. The method of claim 13, wherein the first IIR filter comprises a first order IIR filter having a corresponding first time constant, the second IIR filter comprises a first order IIR filter having a corresponding second time constant, and wherein the corresponding first time constant is different from the corresponding second time constant.

15. The method of claim 14, wherein detecting a change in the received infrared image data comprises detecting motion within the target scene by analyzing image data from a plurality of images captured over time and determining an amount of motion from the analysis.

16. The method of claim 10, wherein detecting a change in the received infrared image data comprises detecting a sufficiently large change in the heat pattern of the target scene being imaged by the infrared camera module.

17. A thermal imaging camera that provides real-time gas imaging, comprising:

an infrared camera module configured to capture infrared radiation and generate infrared images of a target scene comprising infrared image data;

a memory for storing one or more infrared images;

a display;

a camera housing supporting the infrared camera module, the memory, and the display; and one or more processors configured to:

create a filtered background image by combining infrared image data from a first plurality of infrared images captured over time by the infrared camera module using a first filtering process, the first filtering process including a first filtering parameter;

create a filtered foreground image by combining infrared image data from a second plurality of infrared images captured over time by the infrared camera module using a second filtering process, the second filtering process including a second filtering parameter;

create optical gas image data by comparing the filtered background image and the filtered foreground image;

detect a change in the received infrared image data that is indicative of a non-zero amount of change in the captured infrared radiation of the target scene; wherein if the detected change exceeds a threshold:

temporarily adjust the first filtering parameter of the first filtering process to a third filtering parameter in response to the detected change for a first amount of time to reduce the influence of infrared images from the first plurality of infrared images captured at a time prior to the detected change; and/or temporarily adjust the second filtering parameter of the second filtering process to a fourth filtering parameter in response to the detected change for a second amount of time to reduce the influence of infrared images from the second plurality of infrared images captured at a time prior to the detected change if the detected change does not exceed the threshold, then:

do not cause the temporary adjustment of the first filtering parameter of the first filtering process to the third filtering parameter for the first amount of time based on the detected change having not exceeded the threshold; and do not cause the temporary adjustment of the second filtering parameter of the second filtering process to the fourth filtering parameter for the second amount of time based on the detected change having not exceeded the threshold; and generate a display image including the optical gas image data for presentation on the display.

18. The thermal imaging camera of claim 17, further comprising a visible light camera module configured to generate visible light image data representative of the target scene, and wherein detecting motion within the target scene comprises detecting motion in the visible light image data from the visible light camera module.

19. The thermal imaging camera of claim 17, further comprising a user interface by which a user can select between a plurality of modes of operation, and wherein changing modes of operating changes at least one of the first filtering parameter and the second filtering parameter.

20. The thermal imaging camera of claim 19, wherein the selectable modes of operation include a handheld mode and a tripod mode.

21. The thermal imaging camera of claim 17, further comprising a visible light camera module configured to generate visible light image data representative of the target scene, and wherein the display image includes a blend of optical gas image data and at least one of infrared image data and the visible light image data.

* * * * *